(12) United States Patent
Parmar et al.

(10) Patent No.: US 8,868,452 B2
(45) Date of Patent: Oct. 21, 2014

(54) SMART GRID DEPLOYMENT SIMULATOR

(75) Inventors: Vaibhav Parmar, Raleigh, NC (US); Gustavo Talavera, Miami Beach, FL (US)

(73) Assignee: Accenture Global Services Limited, Dublin (IE)

(*) Notice: Subject to any disclaimer, the term of this patent is extended or adjusted under 35 U.S.C. 154(b) by 204 days.

(21) Appl. No.: 13/343,547

(22) Filed: Jan. 4, 2012

(65) Prior Publication Data

US 2012/0109719 A1 May 3, 2012

Related U.S. Application Data

(63) Continuation-in-part of application No. 12/434,167, filed on May 1, 2009, now Pat. No. 8,316,112.

(60) Provisional application No. 61/049,726, filed on May 1, 2008.

(51) Int. Cl.
*G06Q 10/00* (2012.01)
*G06Q 10/06* (2012.01)

(52) U.S. Cl.
CPC .......... *G06Q 10/067* (2013.01); *G06Q 10/0637* (2013.01); *G06Q 10/06375* (2013.01)
USPC ............. 705/28; 709/224; 709/226; 705/7.37

(58) Field of Classification Search
None
See application file for complete search history.

(56) References Cited

U.S. PATENT DOCUMENTS

| | | | |
|---|---|---|---|
| 5,596,570 A * | 1/1997 | Soliman | 370/252 |
| 5,675,581 A * | 10/1997 | Soliman | 370/252 |
| 5,809,282 A * | 9/1998 | Cooper et al. | 709/226 |
| 6,141,565 A * | 10/2000 | Feuerstein et al. | 455/560 |
| 6,421,434 B1 * | 7/2002 | Rosu | 379/133 |
| 6,427,132 B1 * | 7/2002 | Bowman-Amuah | 703/22 |
| 6,609,128 B1 * | 8/2003 | Underwood | 707/610 |
| 6,829,491 B1 * | 12/2004 | Yea et al. | 455/560 |
| 7,401,057 B2 * | 7/2008 | Eder | 706/20 |
| 7,539,288 B2 * | 5/2009 | Wu et al. | 379/10.01 |
| 7,555,227 B2 * | 6/2009 | Bontu et al. | 398/202 |
| 7,668,112 B2 * | 2/2010 | Helfman et al. | 370/252 |
| 7,844,698 B2 * | 11/2010 | Aoyama et al. | 709/224 |
| 7,852,786 B2 * | 12/2010 | Wang et al. | 370/254 |
| 7,961,740 B2 * | 6/2011 | Flammer et al. | 370/400 |
| 8,019,385 B1 * | 9/2011 | Mansour et al. | 455/561 |

(Continued)

FOREIGN PATENT DOCUMENTS

EP 1496717 A 1/2005

OTHER PUBLICATIONS

Massoud Amin, S., and Bruce F. Wollenberg. "Toward a smart grid: power delivery for the 21st century." Power and Energy Magazine, IEEE 3.5 (2005): 34-41.*

(Continued)

*Primary Examiner* — Gurkanwaljit Singh
(74) *Attorney, Agent, or Firm* — Mannava & Kang, P.C.

(57) ABSTRACT

A decision management system simulates a smart grid communications network service deployment using business and technology changeable parameters, models describing traffic profiles for smart grid domain devices and smart grid applications, smart grid infrastructure and a cost model. Candidate solutions for deploying the smart grid service are determined for different sets of changeable parameters through the simulations. These solutions are analyzed to identify a solution for deploying the smart grid service.

16 Claims, 40 Drawing Sheets

(56) References Cited

U.S. PATENT DOCUMENTS

| | | | |
|---|---|---|---|
| 8,098,748 B1* | 1/2012 | Mansour et al. | 375/260 |
| 2003/0050048 A1* | 3/2003 | Abed et al. | 455/414 |
| 2004/0261116 A1* | 12/2004 | Mckeown et al. | 725/109 |
| 2005/0038636 A1* | 2/2005 | Wakelam et al. | 703/1 |
| 2005/0108379 A1* | 5/2005 | Gray et al. | 709/223 |
| 2006/0083366 A1* | 4/2006 | Aoyama et al. | 379/114.01 |
| 2006/0168166 A1* | 7/2006 | Hardwick et al. | 709/221 |
| 2006/0184473 A1* | 8/2006 | Eder | 706/20 |
| 2006/0234714 A1* | 10/2006 | Pollini et al. | 455/446 |
| 2007/0067296 A1* | 3/2007 | Malloy et al. | 707/8 |
| 2007/0092259 A1* | 4/2007 | Bontu et al. | 398/147 |
| 2007/0092260 A1* | 4/2007 | Bontu et al. | 398/152 |
| 2007/0110219 A1* | 5/2007 | Wu et al. | 379/13 |
| 2007/0149186 A1* | 6/2007 | Barbosa da Torre et al. | 455/423 |
| 2007/0299746 A1* | 12/2007 | Haley et al. | 705/28 |
| 2008/0037532 A1* | 2/2008 | Sykes et al. | 370/389 |
| 2008/0043634 A1* | 2/2008 | Wang et al. | 370/252 |
| 2009/0276265 A1 | 11/2009 | Ahmed et al. | |
| 2010/0217550 A1* | 8/2010 | Crabtree et al. | 702/62 |
| 2010/0285788 A1* | 11/2010 | Epifani et al. | 455/418 |
| 2011/0055390 A1* | 3/2011 | Malloy et al. | 709/224 |
| 2012/0109719 A1* | 5/2012 | Parmar et al. | 705/7.37 |

OTHER PUBLICATIONS

Simon, Gyula, et al. "Simulation-based optimization of communication protocols for large-scale wireless sensor networks." IEEE aerospace conference. vol. 3. 2003.*

Wang, Guiling, et al. "Sensor relocation in mobile sensor networks." INFOCOM 2005. 24th Annual Joint Conference of the IEEE Computer and Communications Societies. Proceedings IEEE. vol. 4. IEEE, 2005.*

Wang, You-Chiun, Chun-Chi Hu, and Yu-Chee Tseng. "Efficient deployment algorithms for ensuring coverage and connectivity of wireless sensor networks."Wireless Internet, 2005. Proceedings. First International Conference on. IEEE, 2005.*

Pabst, Ralf, et al. "Relay-based deployment concepts for wireless and mobile broadband radio." Communications magazine, IEEE 42.9 (2004): 80-89.*

Wu, Jie, and Shuhui Yang. "Optimal movement-assisted sensor deployment and its extensions in wireless sensor networks." Simulation Modelling Practice and Theory 15.4 (2007): 383-399.*

* cited by examiner

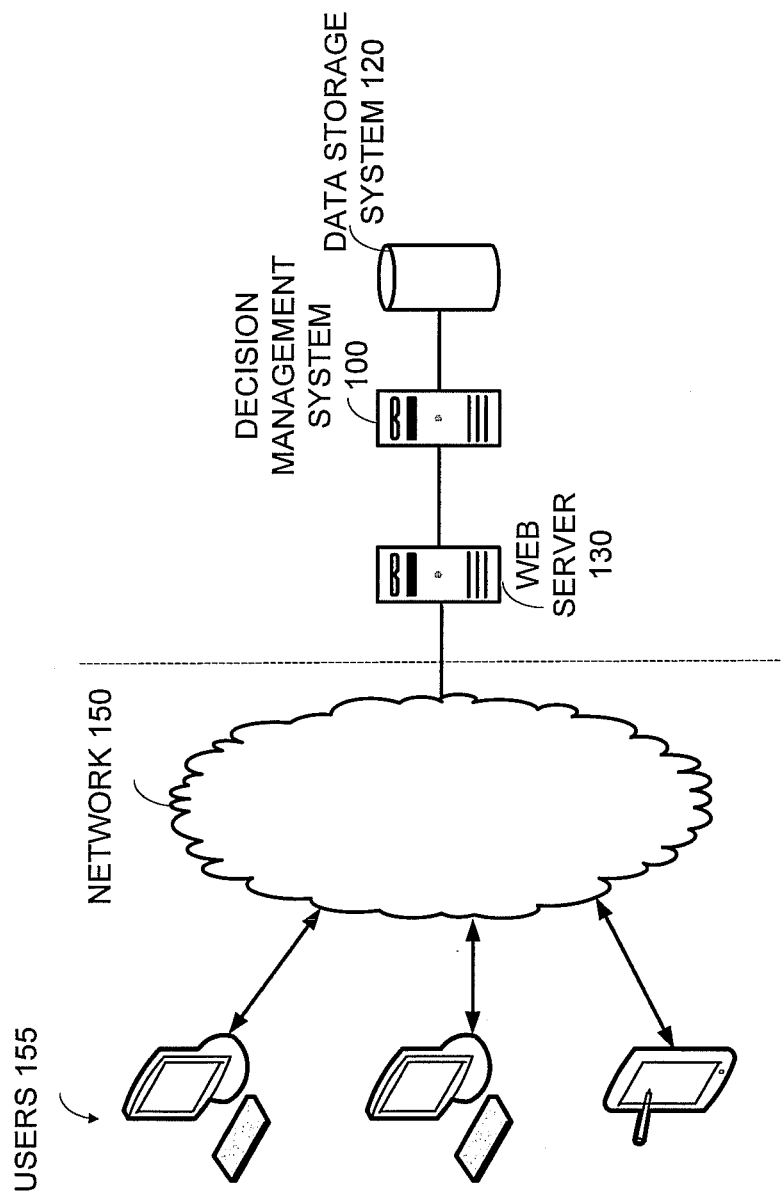

400

401 CHANGEABLE PARAMETERS 402
(X % AREA COVERAGE/ X% POPULATION COVERAGE)

| DOMAIN 410 | DESCRIPTION 420 | CAPEX 430 | OPEX YEAR 5 RUN RATE 440 |
|---|---|---|---|
| RADIO COSTS | RADIO NETWORK DEPLOYMENT, UPGRADES, AND MAINTENANCE | $X BILLION | $X MILLION |
| BACKHAUL COSTS | TRANSPORT FROM CELL SITES TO CORE NETWORK | $X MILLION | $X MILLION |
| CORE NETWORK COSTS | SWITCHING ROUTING, DATA CENTERS, CORE FACILITIES | $X MILLION | $X MILLION |
| OPERATIONS | OPERATIONAL, BUSINESS SUPPORT SYSTEMS, NOC, NETWORK OPS PERSONNEL, IT | $X MILLION | $X MILLION |

FIG. 4

| Home/Customer | Grid/Mobile 3T/Campus | WAN | Operations |
|---|---|---|---|
| • ZigBee<br>• HomePlug<br>• Wifi | • RF Mesh (proprietary)<br>• Point-to-Multipoint (proprietary)<br>• WiFi<br>• WiMAX<br>• Cellular Data<br>• PLC<br>• Serial<br>• Modbus<br>• Ethernet<br>• LMR / Analog & Digital Radio | • Mesh WiFi<br>• Point-to-Multipoint (WiFi, OFDM, proprietary)<br>• WiMAX<br>• LTE<br>• Cellular Data<br>• Microwave<br>• Fiber<br>• Ethernet<br>• MPLS<br>• Satellite | • Smart Meter Head-end and MDMS<br>• Customer Care & Billing<br>• Distribution Management Systems<br>• Outage Management Systems<br>• Field Mobile Worker Systems<br>• IT / Data Center Operations Systems<br>• Telecom Operations Systems<br>• Security Systems<br>• Device and Data Management Systems<br>• Operations Centers |

FIG. 6

Scenario Inputs (701)

Business Assumptions (702)
- Coverage Requirements
- Capacity Requirements
- Timeframes
- Service Quality
- Security Requirements

Technology Assumptions (703)
- Wireless Technologies
- Wired Technologies
- Architecture
- Public vs. Private
- Technical Specifications
- Protocols
- Traffic Management

Cost Assumptions (704)
- Company Owned Costs
  - Unit, Upgrade and Maintenance Costs
  - Scaling Dimensioning Factors
- Public Carrier Costs

Spectrum Assumptions (705)
- Frequency Bands
- Licensed vs. Unlicensed
- Channel Size, Guard Bands
- Regulatory Constraints

Scenario Outputs (710)

Spectrum Required (711)
- Estimate of spectrum required per:
  - Year
  - Frequency band
  - Licensed vs. Unlicensed

Technology Assumptions (712)
- Cost and sizing estimates organized by:
  - Tier (Generation, Transmission, Distribution)
  - Link Type
  - Frequency
  - Technology
  - Public vs. Private

Cost Assumptions (713)
- Cost and sizing estimates organized by:
  - Tier (Generation, Transmission, Distribution)
  - Type: Fiber, T1, etc.
  - Public vs. Company Owned
  - CAPEX, OPEX

Spectrum Assumptions (714)
- CAPEX and OPEX costs
  - Per Annum
  - Aggregated

FIG. 7

| | Bandwidth Required (Current) | | | |
|---|---|---|---|---|
| Subs Transmission Substation | Raw Bandwidth (kbps) | Current Protocol (kbps) | Future Protocol (kbps) | % Change |
| Small | 1.32 | 1.40 | 1.77 | 26.42 |
| Medium | 249.92 | 250.50 | 253.51 | 1.18 |
| Large | 920.92 | 922.11 | 927.65 | 0.60 |
| Gas Transmission & Distribution | Raw Bandwidth (kbps) | Current Protocol (kbps) | Future Protocol (kbps) | % Change |
| Storage Filed | 0.40 | 0.41 | 0.46 | 12.45 |
| Small Station | 0.72 | 0.75 | 0.84 | 12.45 |
| Large Station | 423.63 | 423.67 | 423.83 | 0.04 |
| Electric Distribution Substation | Raw Bandwidth (kbps) | Current Protocol (kbps) | Future Protocol (kbps) | % Change |
| Medium | 1.32 | 1.39 | 1.73 | 24.14 |
| Large | 1.32 | 1.40 | 1.77 | 26.42 |
| Electric Distribution Automation | Raw Bandwidth (kbps) | Current Protocol (kbps) | Future Protocol (kbps) | % Change |
| Medium Circuit | 2.56 | 3.14 | 5.25 | 67.35 |
| Large Circuit | 6.40 | 7.85 | 13.12 | 67.35 |
| Distributed Generation & Storage | Raw Bandwidth (kbps) | Current Protocol (kbps) | Future Protocol (kbps) | % Change |
| Distributed Generation & Storage Total | 112.00 | 112.14 | 112.67 | 0.47 |
| PHEV | Raw Bandwidth (kbps) | Current Protocol (kbps) | Future Protocol (kbps) | % Change |
| PHEV Total | 0.00 | 0.00 | 0.00 | #DIV/0! |
| AMI and In Home | Raw Bandwidth (kbps) | Current Protocol (kbps) | Future Protocol (kbps) | % Change |
| Gas Transmission & Distribution | 1140 | N/A | N/A | N/A |
| Electric | 2230 | N/A | N/A | N/A |
| In Home | 0.00 | N/A | N/A | N/A |
| Mobile Workforce | Raw Bandwidth (kbps) | Current Protocol (kbps) | Future Protocol (kbps) | % Change |
| Cellular | 590.00 | N/A | N/A | N/A |
| Satellite | 300.00 | N/A | N/A | N/A |

FIG. 10A

| Bandwidth Required (Future) | | | | |
|---|---|---|---|---|
| Subs Transmission Substation | Raw Bandwidth (kbps) | Current Protocol (kbps) | Future Protocol (kbps) | % Change |
| Small | 423.72 | 423.80 | 424.17 | 0.09 |
| Medium | 742.72 | 743.35 | 746.31 | 0.40 |
| Large | 3191.32 | 3199.13 | 3241.84 | 1.34 |
| Gas Transmission & Distribution | Raw Bandwidth (kbps) | Current Protocol (kbps) | Future Protocol (kbps) | % Change |
| Storage Filed | 0.43 | 0.45 | 0.50 | 12.45 |
| Small Station | 1.12 | 1.16 | 1.30 | 12.45 |
| Large Station | 424.09 | 424.15 | 424.37 | 0.05 |
| Electric Distribution Substation | Raw Bandwidth (kbps) | Current Protocol (kbps) | Future Protocol (kbps) | % Change |
| Medium | 71.72 | 71.80 | 72.17 | 0.51 |
| Large | 494.12 | 494.20 | 494.57 | 0.07 |
| Electric Distribution Automation | Raw Bandwidth (kbps) | Current Protocol (kbps) | Future Protocol (kbps) | % Change |
| Medium Circuit | 7.68 | 9.41 | 15.74 | 67.35 |
| Large Circuit | 18.56 | 22.74 | 38.05 | 67.35 |
| Distributed Generation & Storage | Raw Bandwidth (kbps) | Current Protocol (kbps) | Future Protocol (kbps) | % Change |
| Distributed Generation & Storage Total | 339.20 | 340.35 | 344.58 | 1.24 |
| PHEV | Raw Bandwidth (kbps) | Current Protocol (kbps) | Future Protocol (kbps) | % Change |
| PHEV Total | 4.72 | 5.008 | 6.06 | 21.09 |
| AMI and In Home | Raw Bandwidth (kbps) | Current Protocol (kbps) | Future Protocol (kbps) | % Change |
| Gas Transmission & Distribution | 2290 | N/A | N/A | N/A |
| Electric | 3380 | N/A | N/A | N/A |
| In Home | 3000 | N/A | N/A | N/A |
| Mobile Workforce | Raw Bandwidth (kbps) | Current Protocol (kbps) | Future Protocol (kbps) | % Change |
| Cellular | 1864.00 | N/A | N/A | N/A |
| Satellite | 300.00 | N/A | N/A | N/A |

FIG. 10B

| Technology Mix (Current) | | | | |
|---|---|---|---|---|
| Subs Transmission Substation | Wireless Public (%) | Wireless Private (%) | Wireline Public (%) | Wireline Private (%) |
| Network Type | 5 | 10 | 5 | 80 |
| Gas Transmission & Distribution | Wireless Public (%) | Wireless Private (%) | Wireline Public (%) | Wireline Private (%) |
| Network Type | 5 | 10 | 5 | 80 |
| Electric Distribution Substation | Wireless Public (%) | Wireless Private (%) | Wireline Public (%) | Wireline Private (%) |
| Network Type | 5 | 30 | 15 | 50 |
| Electric Distribution Automation | Wireless Public (%) | Wireless Private (%) | Wireline Public (%) | Wireline Private (%) |
| Network Type | 20 | 60 | 10 | 10 |
| Distributed Generation & Storage | Wireless Public (%) | Wireless Private (%) | Wireline Public (%) | Wireline Private (%) |
| Network Type | 0 | 0 | 0 | 0 |
| PHEV | Wireless Public (%) | Wireless Private (%) | Wireline Public (%) | Wireline Private (%) |
| Network Type | 0 | 0 | 0 | 0 |
| AMI and In Home | Wireless Public (%) | Wireless Private (%) | Wireline Public (%) | Wireline Private (%) |
| Network Type | 50 | 50 | 0 | 0 |
| Mobile Workforce | Wireless Public (%) | Wireless Private (%) | Wireline Public (%) | Wireline Private (%) |
| Network Type | 80 | 5 | 5 | 5 |

FIG. 10C

| | Technology Mix (Future) | | | |
|---|---|---|---|---|
| Subs Transmission Substation | Wireless Public (%) | Wireless Private (%) | Wireline Public (%) | Wireline Private (%) |
| Network Type | 5 | 20 | 5 | 70 |
| Gas Transmission & Distribution | Wireless Public (%) | Wireless Private (%) | Wireline Public (%) | Wireline Private (%) |
| Network Type | 5 | 10 | 15 | 70 |
| Electric Distribution Substation | Wireless Public (%) | Wireless Private (%) | Wireline Public (%) | Wireline Private (%) |
| Network Type | 5 | 30 | 15 | 50 |
| Electric Distribution Automation | Wireless Public (%) | Wireless Private (%) | Wireline Public (%) | Wireline Private (%) |
| Network Type | 10 | 75 | 5 | 10 |
| Distributed Generation & Storage | Wireless Public (%) | Wireless Private (%) | Wireline Public (%) | Wireline Private (%) |
| Network Type | 10 | 50 | 10 | 30 |
| PHEV | Wireless Public (%) | Wireless Private (%) | Wireline Public (%) | Wireline Private (%) |
| Network Type | 50 | 0 | 50 | 0 |
| AMI and In Home | Wireless Public (%) | Wireless Private (%) | Wireline Public (%) | Wireline Private (%) |
| Network Type | 50 | 50 | 0 | 0 |
| Mobile Workforce | Wireless Public (%) | Wireless Private (%) | Wireline Public (%) | Wireline Private (%) |
| Network Type | 80 | 5 | 5 | 5 |

FIG. 10D

| Monitoring Application | Use case (Workbook Tab) | Sample size (Bytes) | Sample rate per unit | Unit | Raw Rate (kbps) | Raw + Current Overhead Rate (kbps) | Raw + Future Overhead Rate (kbps) | Latency (ms) |
|---|---|---|---|---|---|---|---|---|
| Transformer | Substation Automation | 60 | 15 | s | 7.2 | 8.28 | 12.24 | 100 |
| Capacitor Bank | Substation Automation | 60 | 15 | s | 7.2 | 8.28 | 12.24 | 100 |
| PMU | Substation Automation | 1950 | 128 | s | 2000 | 2006.02 | 2039.81 | 30 |
| Recloser | Substation Automation | 60 | 15 | s | 7.2 | 8.28 | 12.24 | 100 |
| SCADA RTU | Substation Automation | 319 | 1 | s | 1.2 | 1.27 | 1.61 | 1,000 |
| Motor operated disconnect | Substation Automation | NA | NA | s | | | | 1,000 |
| MPAC and HMI Sever | Substation Automation | 226000 | 1 | s | 172 | 172.07 | 172.41 | <1,000 |
| Regulator | Gas Transmission and Distribution | 256 | 1 | m | 226 | 226.5 | 228.86 | 15,000 to 45,000 |
| Analyzer/Chromatograph | Gas Transmission and Distribution | 256 | 1 | m | 0.033 | 0.034 | 0.038 | 15,000 to 45,000 |
| Compressor | Gas Transmission and Distribution | 256 | 1 | m | 0.033 | 0.034 | 0.038 | 15,000 to 45,000 |
| Storage Container | Gas Transmission and Distribution | 256 | 1 | m | 0.033 | 0.034 | 0.038 | 15,000 to 45,000 |
| Electronic Recorders (ERX) | Gas Transmission and Distribution | 256 | 1 | m | 0.033 | 0.034 | 0.038 | 15,000 |
| FCI monitoring | Distribution Automation | 40 | 2 | s | 0.64 | 0.778 | 1.31 | 100 |
| Line Switch | Distribution Automation | 40 | 2 | s | 0.64 | 0.78 | 1.31 | 100 |
| Line Transformer | Distribution Automation | 40 | 2 | s | 0.64 | 0.78 | 1.31 | 100 |

FIG. 11A

| Monitoring Application | Use case (Workbook Tab) | Sample size (Bytes) | Sample rate per unit | Unit | Raw Rate (kbps) | Raw + Current Overhead Rate (kbps) | Raw + Future Overhead Rate (kbps) | Latency (ms) |
|---|---|---|---|---|---|---|---|---|
| Circuit Breaker | Distribution Automation | 40 | 2 | s | 0.64 | 0.78 | 1.31 | 100 |
| Recloser | Distribution Automation | 40 | 2 | s | 0.64 | 0.78 | 1.31 | 100 |
| Capacitor Bank | Distribution Automation | 40 | 2 | s | 0.64 | 0.78 | 1.31 | 100 |
| Distributed Generation Solar | Distribution Generation | 7000 | 1 | s | 56 | 56.07 | 56.34 | 500 |
| Distributed Generation Wind | Distribution Generation | 7000 | 1 | s | 56 | 56.07 | 56.34 | 500 |
| Distributed Storage | Distribution Generation | 7000 | 1 | s | 56 | 56.07 | 56.34 | 500 |
| Line Transformer | Distribution Generation | 40 | 2 | s | 0.64 | 0.78 | 1.31 | 100 |
| PHEV-Charging Information | PHEV | 255 | 1 | s | 2.04 | 2.11 | 2.38 | 500 |
| Meter Reading-Current | AMI | 1,500 | 1 | Hour | 0.05 | - | - | >20000 |
| Meter Reading-Future | AMI | 1,500 | 4 | Hour | 1.2 | - | - | >6000 |
| Last gasp/restorations | AMI | 1,500 | N/A | N/A | 1.09 | - | - | >20000 |
| In-home device control | AMI | 3,125 | 12 | m | 3 | - | - | 6000 |
| Firmware Updates | AMI | 500,000 | N/A | N/A | 1.09 | - | - | >20000 |
| Video Surveillance | Corporate | 48,000 | 2 | s | 384 | - | - | 50 |
| Mobile worker-Voice (PTT) | Mobile Worker | 1 | 8 | s | 90 | - | - | 100 |
| Mobile worker-Cellular Data | Mobile Worker | 4,500 | N/A | N/A | 500 | - | - | 500 |
| Mobile worker-Satellite Data | Mobile Worker | 4,500 | N/A | N/A | 300 | - | - | 1200 |
| Mobile worker-Video | Mobile Worker | 21,875 | 2 | s | 350 | - | - | 50 |
| VoIP | Data Network | 20 | 400 | s | 64 | - | - | 150 |
| Routers/ Switches/ Security | Data Network | N/A | N/A | N/A | 10% of total Bandwidth | - | - | >5,000 |
| For Future Expansion | | | | | | | | |
| For Future Expansion | | | | | | | | |
| For Future Expansion | | | | | | | | |

FIG. 11B

TRANSMISSION SUBSTATIONS (CURRENT)

| Substation | # of Devices Being Monitored | Payload Size (bytes) | Latency (ms) | Reliability | Security | Back up Power | Traffic Profile (Continuous/ Bursty) | IP Enable | Aggregate Bandwidth (kbps) | Aggregate Bandwidth Current Protocol Overhead (kbps) | Aggregate Bandwidth Current Future Overhead (kbps) |
|---|---|---|---|---|---|---|---|---|---|---|---|
| Transmission Substation 1 (Small) | 1 | | | | | | | | 1.32 | 1.40 | 1.77 |
| SCADA RTU | 1 | 150 | 1,000 | >99% | H | Yes | Continuous | Serial | 1.20 | 1.27 | 1.61 |
| Routers/Switches/Security | 2 | Various | >5,000 | 99.95% | M | Yes | Continuous | IP | 0.12 | 0.13 | 0.16 |
| Transmission Substation 1 (Medium) | 11 | | | | | | | | 249.92 | 250.55 | 253.51 |
| SCADA RTU | 1 | 150 | 1,000 | 99.50% | H | Yes | Continuous | Serial | 1.20 | 1.27 | 1.61 |
| MPAC and HMI Console | 1 | 226,000 | <1,000 | 99.50% | H | Yes | Continuous | IP | 226.00 | 226.50 | 228.86 |
| Routers/Switches/Security | 2 | Various | >5,000 | 99.50% | M | Yes | Continuous | IP | 22.72 | 22.78 | 23.05 |
| Transmission Substation 2 (Large) | 27 | | | | | | | | 920.92 | 922.11 | 927.65 |
| SCADA RTU | 1 | 150 | 1,000 | >99% | H | Yes | Continuous | Serial | 1.20 | 1.27 | 1.61 |
| Video Surveillance | 6 | 4,800 | 50 | >97% | L | Yes | Bursty | IP | 384.00 | 384.00 | 384.00 |
| MPAC and HMI Console | 2 | 226,000 | <1,000 | 99.95% | H | Yes | Continuous | IP | 452.00 | 453.01 | 457.71 |
| Routers/Switches/Security | 4 | Various | >5,000 | 99.95% | M | Yes | Continuous | IP | 83.72 | 83.83 | 84.33 |

FIG. 12A

| TRANSMISSION SUBSTATIONS (FUTURE) | | | | | | | | | | | |
|---|---|---|---|---|---|---|---|---|---|---|---|
| Substation | # of Devices Being Monitored | Payload Size (bytes) | Latency (ms) | Reliability | Security | Back up Power | Traffic Profile (Continuous/ Bursty) | IP Enable | Aggregate Bandwidth Payload Only (kbps) | Aggregate Bandwidth Current Protocol Overhead (kbps) | Aggregate Bandwidth Future Protocol Overhead (kbps) |
| Transmission Substation 1 (Small) | 4 | | | | | | | | | | |
| SCADA RTU | 1 | 150 | 1,000 | >99% | H | Yes | Continuous | Serial | 423.72 | 423.80 | 424.17 |
| Video Surveillance | 2 | 4,800 | 50 | >97% | L* | Yes | Bursty | IP | 1.20 | 1.27 | 1.61.384 |
| Routers/ Switches/ Security | 1 | Various | >5,000 | >99% | L | | Bursty | IP | 384.00 | 384.00 | 38.56 |
| Transmission Substation 1 (Medium) | 15 | | | | | | | | 38.52 | 38.53 | 38.56 |
| SCADA RTU | 1 | 150 | 1,000 | >99% | H | Yes | Continuous | Serial | 742.72 | 743.35 | 746.31 |
| Video Surveillance | 4 | 4,800 | 50 | >97% | L* | Yes | Bursty | IP | 1.20 | 1.27 | 1.61 |
| VoIP | - | 20 | 150 | >99% | L | Yes | Bursty | IP | 384.00 | 384.00 | 384.00 |
| MPAC and HMI Console | 1 | 193,000 | <1,000 | 99.95% | H | Yes | Continuous | IP | 64.00 | 64.00 | 64.00 |
| Routers/ Switches | 2 | Various | >5,000 | 99% | L | Yes | Continuous | IP | 226.00 | 226.50 | 228.86 |
| Transmission Substation 2 (Large) | 27 | | | | | | | | 67.52 | 67.58 | 67.85 |
| SCADA RTU | 1 | 150 | 1,000 | >99% | H | Yes | Continuous | Serial | 3,191.32 | 3199.13 | 3241.84 |
| PMU | 1 | 1,950 | 30 | >99% | H | Yes | Bursty | IP | 1.20 | 1.27 | 1.61 |
| Video Surveillance | 6 | 4,800 | 50 | >97% | L* | Yes | Bursty | IP | 2,000.00 | 2006.02 | 2039.81 |
| VoIP | - | 20 | 150 | >99% | L | Yes | Bursty | IP | 384.00 | 384.00 | 384.00 |
| MPAC and HMI Console | 2 | 193,000 | <1,000 | 99.95% | H | Yes | Continuous | IP | 64.00 | 64.00 | 64.00 |
| Routers/ Switches | 3 | Various | >5,000 | 99% | L | Yes | Continuous | IP | 452.00 | 453.01 | 457.71 |
| | | | | | | | | | 290.12 | 290.83 | 294.71 |

FIG. 12B

GAS TRANSMISSION SUBSTATION (CURRENT)

| Station | # of Devices Being Monitored | Payload Size (bytes) | Latency (ms) | Reliability | Security | Back up Power | Traffic Profile (Continuous /Bursty) | IP Enable | Aggregate Bandwidth Payload Only (kbps) | Aggregate Bandwidth Current Protocol Overhead (kbps) | Aggregate Bandwidth Future Protocol Overhead (kbps) |
|---|---|---|---|---|---|---|---|---|---|---|---|
| Storage Field | 14 | | | | | | | | 0.396 | 0.410 | 0.462 |
| Regulator | 5 | 256 | 15,000 to 45,000 | >99% | H | Yes | Continuous | Serial | 0.164 | 0.170 | 0.191 |
| Analyzer/Chromatograph | 0 | 256 | 15,000 to 45,000 | >99% | H | Yes | Continuous | Serial | 0.000 | 0.000 | 0.000 |
| Compressor | 1 | 256 | 15,000 to 45,000 | >99% | H | Yes | Continuous | Serial | 0.033 | 0.034 | 0.038 |
| Storage Container | 5 | 256 | 15,000 to 45,000 | >99% | H | Yes | Continuous | Serial | 0.164 | 0.170 | 0.191 |
| Routers/Switches/Security | 3 | Various | >5,000 | 99.95 | M | Yes | Continuous | IP | 0.036 | 0.037 | 0.042 |
| Small Station | 23 | | | | | | | | 0.721 | 0.746 | 0.839 |
| Regulator | 15 | 256 | 15,000 to 45,000 | >99% | H | Yes | Continuous | Serial | 0.492 | 0.509 | 0.572 |
| Analyzer/Chromatograph | 1 | 256 | 15,000 to 45,000 | >99% | H | Yes | Continuous | Serial | 0.033 | 0.034 | 0.038 |
| Compressor | 2 | 256 | 15,000 to 45,000 | >99% | H | Yes | Continuous | Serial | 0.066 | 0.068 | 0.076 |
| Storage Container | 2 | 256 | 15,000 to 45,000 | >99% | H | Yes | Continuous | Serial | 0.066 | 0.068 | 0.076 |
| Routers/Switches/Security | 3 | Various | >5,000 | 99.95 | M | Yes | Continuous | IP | 0.066 | 0.068 | 0.076 |

FIG. 13A

| Station | # of Devices Being Monitored | Payload Size (bytes) | Latency (ms) | Reliability | Security | Back up Power | Traffic Profile (Continuous /Bursty) | IP Enable | Aggregate Bandwidth Payload Only (kbps) | Aggregate Bandwidth Current Protocol Overhead (kbps) | Aggregate Bandwidth Future Protocol Overhead (kbps) |
|---|---|---|---|---|---|---|---|---|---|---|---|
| Large Station | 37 | | | | | | | | 423.626 | 423.669 | 423.827 |
| Regular | 25 | 256 | 15,000 to 45,000 | >99% | H | Yes | Continuous | Serial | 0.819 | 0.848 | 0.954 |
| Analyzer/Chromatograph | 3 | 256 | 15,000 to 45,000 | >99% | H | Yes | Continuous | Serial | 0.098 | 0.102 | 0.114 |
| Compressor | 3 | 256 | 15,000 to 45,000 | >99% | H | Yes | Continuous | Serial | 0.098 | 0.102 | 0.114 |
| Storage Container | 3 | 256 | 15,000 to 45,000 | >99% | H | Yes | Continuous | Serial | 0.098 | 0.102 | 0.114 |
| Routers/Switches/Security | 3 | Various | >5,000 | 99.95 | M | Yes | Continuous | IP | 38.511 | 38.515 | 38.530 |
| Video/Surveillance | 4 | 4,800 | 50 | >97% | L* | Yes | Bursty | IP | 384.000 | 384.000 | 384.000 |

FIG. 13A (Cont'd)

GAS TRANSMISSION SUBSTATION (FUTURE)

| Station | # of Devices Being Monitored | Payload Size (bytes) | Latency (ms) | Reliability | Security | Back up Power | Traffic Profile (Continuous/ Bursty) | IP Enable | Aggregate Bandwidth Payload Only (kbps) | Aggregate Bandwidth Current Protocol Overhead (kbps) | Aggregate Bandwidth Future Protocol Overhead (kbps) |
|---|---|---|---|---|---|---|---|---|---|---|---|
| Storage Field | 15 | | | | | | | | 0.433 | 0.448 | 0.504 |
| Regulator | 5 | 256 | <15,000 | >99% | H | Yes | Continuous | Serial | 0.164 | 0.170 | 0.191 |
| Analyzer/Chromatograph | 1 | 256 | <15,000 | >99% | H | Yes | Continuous | Serial | 0.033 | 0.034 | 0.038 |
| Compressor | 1 | 256 | <15,000 | >99% | H | Yes | Continuous | Serial | 0.033 | 0.034 | 0.038 |
| Storage Container | 5 | 256 | <15,000 | >99% | H | Yes | Continuous | Serial | 0.164 | 0.170 | 0.191 |
| Routers/Switches/ Security | 3 | Various | >5,000 | 99.95 | M | Yes | Continuous | IP | 0.039 | 0.041 | 0.046 |
| Small Station | 33 | | | | | | | | 1.118 | 1.157 | 1.301 |
| Regulator | 20 | 256 | <15,000 | >99% | H | Yes | Continuous | Serial | 0.655 | 0.678 | 0.763 |
| Analyzer/Chromatograph | 2 | 256 | <15,000 | >99% | H | Yes | Continuous | Serial | 0.066 | 0.068 | 0.076 |
| Compressor | 4 | 256 | <15,000 | >99% | H | Yes | Continuous | Serial | 0.131 | 0.136 | 0.153 |

FIG. 13B

| Station | # of Devices Being Monitored | Payload Size (bytes) | Latency (ms) | Reliability | Security | Back up Power | Traffic Profile (Continuous /Bursty) | IP Enable | Aggregate Bandwidth Payload Only (kbps) | Aggregate Bandwidth Current Protocol Overhead (kbps) | Aggregate Bandwidth Future Protocol Overhead (kbps) |
|---|---|---|---|---|---|---|---|---|---|---|---|
| Storage Container Routers/ Switches/Security | | | <15,000 | | | | | | | | |
| Security | 4 | 256 | >5,000 | >99% | H | Yes | Continuous | Serial | 0.131 | 0.136 | 0.153 |
| Electronic Recorders (ERX) | 3 | Various | >5,000 | 99.95 | M | Yes | Continuous | IP | 0.102 | 0.105 | 0.118 |
| Large Station | 1 | 256 | <15,000 | >99% | H | Yes | | Serial | 0.033 | 0.034 | 0.038 |
| Regulator | 49 | | | | | | | | 424.095 | 424.154 | 424.372 |
| Analyzer/Chromatograph | 30 | 256 | <15,000 | >99% | H | Yes | Continuous | Serial | 0.983 | 1.018 | 1.144 |
| Compressor | 5 | 256 | <15,000 | >99% | H | Yes | Continuous | Serial | 0.164 | 0.17 | 0.191 |
| Storage Container Routers/ Switches/ | 5 | 256 | <15,000 | >99% | H | Yes | Continuous | Serial | 0.164 | 0.17 | 0.191 |
| Security | 5 | 256 | 0 | >99% | H | Yes | Continuous | Serial | 0.164 | 0.17 | 0.191 |
| Electronic Recorders (ERX) | 4 | Various | >5,000 | 99.95 | M | Yes | Continuous | IP | 38.554 | 38.559 | 38.579 |
| Video Surveillance | 2 | 256 | 0 | >99% | H | Yes | Continuous | Serial | 0.066 | 0.068 | 0.076 |
| | 4 | 4,800 | 50 | >97% | L* | Yes | Bursty | IP | 384 | 384 | 384 |

FIG. 13B (Cont'd)

| Substation | # of Devices Being Monitored | Payload Size (bytes) | Latency (ms) | Reliability | Security | Back up Power | Traffic Profile (Continuous /Bursty) | IP Enable | Aggregate Bandwidth Payload Only (kbps) | Aggregate Bandwidth Current Protocol Overhead (kbps) | Aggregate Bandwidth Current Future Overhead (kbps) |
|---|---|---|---|---|---|---|---|---|---|---|---|
| Distribution Substations (Current) | | | | | | | | | | | |
| Distribution Substation 1 (Med) | 3 | | | | | | | | | | |
| SCADA RTU | 1 | 150 | 1,000 | >99% | H | Yes | Continuous | Serial | 1.32 | 1.39 | 1.73 |
| Routers/Switches/Security | 1 | Various | >5,000 | 99.00% | M | Yes | Continuous | IP | 1.20 | 1.27 | 1.61 |
| Distribution Substation 2 (Large) | 3 | | | | | | | | 0.12 | 0.12 | 0.12 |
| SCADA RTU | 1 | 150 | 1,000 | >99% | H | Yes | Continuous | Serial | 1.32 | 1.40 | 1.77 |
| Routers/Switches/Security | 2 | Various | >5,000 | 99.00% | M | Yes | Continuous | IP | 1.20 | 1.27 | 1.61 |
| | | | | | | | | | 0.12 | 0.13 | 0.16 |

FIG. 14A

DISTRIBUTION SUBSTATIONS (FUTURE)

| Substation | # of Devices Being Monitored | Payload Size (bytes) | Latency (ms) | Reliability | Security | Back up Power | Traffic Profile (Continuous/ Bursty) | IP Enable | Aggregate Bandwidth Payload Only (kbps) | Aggregate Bandwidth Current Protocol Overhead (kbps) | Aggregate Bandwidth Current Future Overhead (kbps) |
|---|---|---|---|---|---|---|---|---|---|---|---|
| Distribution Substation 1 (Med) | 1 | | | | | | | | | | |
| SCADA RTU | 1 | 150 | 1,000 | >99% | H | Yes | Continuous | Serial | 71.72 | 71.80 | 72.17 |
| VoIP | 1 | 20 | 150 | >99% | L | | Bursty | IP | 1.20 | 1.27 | 1.61 |
| Routers/ Switches/ Security | 1 | Various | >5,000 | 99% | M | Yes | Continuous | IP | 64.00 | 64.00 | 64.00 |
| Distribution Substation 2 (Large) | 5 | | | | | | | | 6.52 | 6.53 | 6.56 |
| SCADA RTU | 1 | 150 | 1,000 | >99% | H | Yes | Continuous | Serial | 494.12 | 494.20 | 494.57 |
| Video Surveillance | 4 | 4,800 | 50 | >97% | L* | | Bursty | IP | 1.20 | 1.27 | 1.61 |
| VoIP | 1 | 20 | 150 | >97% | L | | Bursty | IP | 384.00 | 384.00 | 384.00 |
| Routers/ Switches/ Security | 2 | Various | >5,000 | 99% | M | Yes | Continuous | IP | 64.00 | 64.00 | 64.00 |
| | | | | | | | | | 44.92 | 44.93 | 44.96 |

FIG. 14B

ELECTRICAL DISTRIBUTION CIRCUITS (CURRENT)

| Distribution Circuit | # of Devices Being Monitored | Payload Size (bytes) | Latency (ms) | Reliability | Security | Back up Power | Traffic Profile (Continuous/Bursty) | IP Enable | Aggregate Bandwidth Payload Only (kbps) | Aggregate Bandwidth Current Protocol Overhead (kbps) | Aggregate Bandwidth Current Future Overhead (kbps) |
|---|---|---|---|---|---|---|---|---|---|---|---|
| Distribution Circuit 1 (Med) | 4 | | | | | | | | 2.56 | 3.14 | 5.25 |
| Line Switch | 2 | 40 | 100 | >99% | M | Yes | Continuous | Serial | 1.28 | 1.57 | 2.62 |
| Recloser | 2 | 40 | 100 | >99% | M | Yes | Continuous | Serial | 1.28 | 1.57 | 2.62 |
| Distribution Circuit 2 (Large) | 10 | | | | | | | | 6.40 | 7.84 | 13.12 |
| Line Switch | 4 | 40 | 100 | >99% | M | Yes | Continuous | Serial | 2.56 | 3.14 | 5.25 |
| Recloser | 6 | 40 | 100 | >99% | M | Yes | Continuous | Serial | 3.84 | 4.70 | 7.87 |

FIG. 15A

ELECTRICAL DISTRIBUTION CIRCUITS (FUTURE)

| Distribution Circuit | # of Devices Being Monitored | Total Payload Size (bytes) | Latency (ms) | Reliability | Security | Back up Power | Traffic Profile (Continuous/Bursty) | IP Enable | Aggregate Bandwidth Payload Only (kbps) | Aggregate Bandwidth Current Protocol Overhead (kbps) | Aggregate Bandwidth Current Future Overhead (kbps) |
|---|---|---|---|---|---|---|---|---|---|---|---|
| Distribution Circuit 1 (Med) | 12 | | | | | | | | 7.68 | 9.41 | 15.74 |
| Line Switch | 4 | 40 | 100 | >99% | H* | Yes | Bursty* | Serial | 2.56 | 3.14 | 5.25 |
| Line Transformer | 2 | 40 | 100 | >99% | H | Yes | Continuous | Serial | 1.28 | 1.57 | 2.62 |
| Recloser | 4 | 40 | 100 | >99.5% | H* | Yes | Bursty* | Serial | 2.56 | 3.14 | 5.25 |
| Capacitor Bank | 2 | 40 | 100 | >99% | H | Yes | Continuous | Serial | 1.28 | 1.57 | 2.62 |
| Distribution Circuit 2 (Large) | 29 | | | | | | | | 18.56 | 22.74 | 38.05 |
| Line Switch | 8 | 40 | 100 | >99% | H* | Yes | Bursty* | Serial | 5.12 | 6.27 | 105.00 |
| Line Transformer | 4 | 40 | 100 | >99% | H | Yes | Continuous | Serial | 2.56 | 3.14 | 5.25 |
| Recloser | 12 | 40 | 100 | >99.5% | H* | Yes | Bursty* | Serial | 7.68 | 9.41 | 15.74 |
| Capacitor Bank | 5 | 40 | 100 | >99% | H | Yes | Continuous | Serial | 3.20 | 3.92 | 6.56 |

FIG. 15B

| DISTRIBUTED GENERATION AND STORAGE (CURRENT) | | | | | | | | | | | |
|---|---|---|---|---|---|---|---|---|---|---|---|
| Distributed Generation Type | # of Devices Being Monitored | Total Payload Size (bytes) | Latency (ms) | Reliability | Security | Back up Power | Traffic Profile (Continuous/Bursty) | IP Enable | Aggregate Bandwidth Payload Only (kbps) | Aggregate Bandwidth Current Protocol Overhead (kbps) | Aggregate Bandwidth Current Future Overhead (kbps) |
| Distributed Generation | 2 | | | | | | | | 112 | 112.11 | 112.672 |
| Distributed Generation-Solar | 1 | 7000 | 500 | >99%** | L | No | Bursty | Serial | 56 | 56.07 | 56.336 |
| Distributed Generation-Wind | 1 | 7000 | 500 | >99%** | L | No | Bursty | Serial | 56 | 56.07 | 56.336 |
| Distributed Storage | 0 | 7000 | 500 | >99.5* | L | No | Burst* | Serial | 0 | 0.00 | 0.000 |
| Line Transformer | 0 | 40 | 100 | >99% | L | Yes | Continuous | Serial | 0 | 0.00 | 0.000 |

FIG. 16A

DISTRIBUTED GENERATION AND STORAGE (FUTURE)

| Distributed Generation Type | # of Devices Being Monitored | Total Payload Size (bytes) | Latency (ms) | Reliability | Security | Back up Power | Traffic Profile (Continuous /Bursty) | IP Enable | Aggregate Bandwidth Payload Only (kbps) | Aggregate Bandwidth Current Protocol Overhead (kbps) | Aggregate Bandwidth Current Future Overhead (kbps) |
|---|---|---|---|---|---|---|---|---|---|---|---|
| Distributed Generation | 11 | | | | | | | | 339 | 340.352 | 344.576 |
| Distributed Generation- Solar | 3 | 7000 | 500 | >99%** | M** | No | Bursty | Serial | 168 | 168.216 | 169.008 |
| Distributed Generation- Wind | 3 | 7000 | 500 | >99%** | M** | No | Bursty | Serial | 168 | 168.216 | 169.008 |
| Distributed Storage | 0 | 7000 | 500 | >99.5* | H* | No | Burst* | Serial | 0 | 0.000 | 0.000 |
| Line Transformer | 5 | 40 | 100 | >99% | H | Yes | Continuous | Serial | 3 | 3.920 | 6.560 |

FIG. 16B

| PHEV (CURRENT AND FUTURE) | | | | | | | | | | |
|---|---|---|---|---|---|---|---|---|---|---|
| PHEV (Monitoring) | # of Devices Being Monitored | Payload Size (bytes) | Latency (ms) | Reliability | Security | Back up Power | Traffic Profile (Continuous/ Bursty) | IP Enable | Aggregate Bandwidth Payload Only (kbps) | Aggregate Bandwidth Current Protocol Overhead (kbps) | Aggregate Bandwidth Current Future Overhead (kbps) |
| PHEV | 0 | | | | | | | | 0.00 | 0 | 0 |
| PHEV Charging Information (per line) | 0 | 255 | 100 | >99.5%* | M* | No | Bursty | IP | 0.00 | 0 | 0 |
| Line Transformer | 0 | 40 | 100 | >99% | M | Yes | Continuous | Serial | 0.00 | 0 | |
| FUTURE | | | | | | | | | | | |
| PHEV (Monitoring) | # of Devices Being Monitored | Payload Size (bytes) | Latency (ms) | Reliability | Security | Back up Power | Traffic Profile (Continuous/Bursty) | IP Enable | Aggregate Bandwidth Payload Only (kbps) | Aggregate Bandwidth Current Protocol Overhead (kbps) | Aggregate Bandwidth Current Future Overhead (kbps) |
| PHEV | 3 | | | | | | | | 4.72 | 5.008 | 6.064 |
| PHEV Charging Information (per line) | 2 | 255 | 500 | >99.5%* | M* | No | Bursty | IP | 4.08 | 4.224 | 4.752 |
| Line Transformer | 1 | 40 | 100 | >99% | H | Yes | Continuous | Serial | 0.64 | 0.78 | 1.31 |

FIG. 17

AUTOMATED METERING INFRASTRUCTURE/HOME AREA NETWORK (CURRENT)

| AMI/HAN | # of Devices Being Monitored | Total Payload Size (bytes) | Latency (ms) | Reliability | Security | Back up Power | Traffic Profile (Continuous/ Bursty) | IP Enable | Aggregate Bandwidth (kbps) |
|---|---|---|---|---|---|---|---|---|---|
| Gas | | | | | | | | | |
| Meter Reading-Gas | 1,000 | 1,500 | >20,000 | >95% | M | Yes | Continuous | IP | 1140 |
| Last Gasp-Gas | 1,000 | 1,500 | >20,000 | >95% | M | Yes | Bursty | IP | 50 |
| Electric | | | | | | | | | 1090 |
| Meter Reading-Electric | 1,000 | 1,500 | >20,000 | >95% | M | Yes | Continuous | IP | 2230 |
| Last Gasp-Electric | 1,000 | 1,500 | >20,000 | >95% | M | Yes | Bursty | IP | 50 |
| Firmware Updates-Electric | 1,000 | 500,000 | >20,000 | >95% | L | Yes | Bursty | IP | 1090 |
| In Home Device | | | | | | | | | 1090 |
| In Home Device Control *** | 0 | 3,125 | >6,000 | >99%** | M** | Yes | Bursty | IP | 0 |
| | | | | | | | | | 0 |

FIG. 18A

| AUTOMATED METERING INFRASTRUCTURE/HOME AREA NETWORK (CURRENT) | | | | | | | | |
|---|---|---|---|---|---|---|---|---|
| AMI/HAN | # of Devices Being Monitored | Total Payload Size (bytes) | Latency (ms) | Reliability | Security | Back up Power | Traffic Profile (Continuous/Bursty) | IP Enable | Aggregate Bandwidth (kbps) |
| Gas | | | | | | | | | 2290 |
| Meter Reading-Gas | 1,000 | 1,500 | >6,000 | >98%* | M* | Yes | Continuous | IP | 1200 |
| Last Gasp-Gas | 1,000 | 1,500 | >20,000 | >98%* | M* | Yes | Bursty | IP | 1090 |
| Electric | | | | | | | | | 3380 |
| Meter Reading-Electric | 1,000 | 1,500 | >6,000 | >98%* | M* | Yes | Continuous | IP | 1200 |
| Last Gasp-Electric | 1,000 | 1,500 | >20,000 | >98%* | M* | Yes | Bursty | IP | 1090 |
| Firmware Updates-Electric | 1,000 | 500,000 | >20,000 | >98%* | L | Yes | Bursty | IP | 1090 |
| In Home Device | | | | | | | | | 3000 |
| In Home Device Control *** | 1,000 | 3,125 | >6,000 | >99%** | M** | Yes | Bursty | IP | 3000 |

FIG. 18B

MOBILE WORKER (CURRENT AND FUTURE)

Current

| Worker | # of Services/ Worker | Total Payload Size (bytes) | Latency (ms) | Reliability | Security | Back up Power | Traffic Profile (Continuous/ Bursty) | IP Enable | Aggregate Bandwidth (kbps) |
|---|---|---|---|---|---|---|---|---|---|
| Mobile Worker-Cellular | 2 | | | | | | | | 590 |
| Mobile worker-Voice (PTT) | 1 | 1 | 8 | >99% | L | No | Bursty | IP | 90 |
| Mobile worker-Data | 1 | 4,500 | 500 | >95% | L | No | Bursty | IP | 500 |
| Mobile Worker-Satellite | 1 | | | | | | | IP | 300 |
| Mobile worker-Satellite | 1 | 4,500 | 1,200 | >95% | L | No | Bursty | | 300 |

Future

| Worker | # of Services/ Worker | Total Payload Size (bytes) | Latency (ms) | Reliability | Security | Back up Power | Traffic Profile (Continuous/ Bursty) | IP Enable | Aggregate Bandwidth (kbps) |
|---|---|---|---|---|---|---|---|---|---|
| Mobile Worker-Cellular | 7 | | | | | | | | 1864 |
| Mobile Worker-Voice (PTT) | 1 | 1 | 8 | >99% | L | No | Bursty | IP | 90 |
| Mobile Worker-Data | 1 | 4,500 | 500 | >95% | L | No | Bursty | IP | 500 |
| Mobile woker-Video | 1 | 21,875 | 50 | >95% | L | No | Bursty | IP | 384 |
| VoIP | 1 | 20 | 150 | >95% | L | No | Bursty | IP | 90 |
| Future Services | 1 | Various | 500 | | | No | Bursty | IP | 800 |
| Mobile Worker-Satellite | 1 | | | | | | | | 300 |
| Mobile worker-Satellite | 1 | 4,500 | 1,200 | >95% | L | No | Bursty | IP | 300 |

FIG. 19

| 2001 | |
|---|---|
| Network and Traffic Dimensioning | |
| # of Channels | 1 |
| Cell Split? | No |
| Load Trafffic on Broadband RF? | No |
| 1.4 MHz Channel | |
| # of Sites | 1518 |
| # of Cells | 4454 |
| 3 MHz Channel | |
| # of Sites | 1174 |
| # of Cells | 3522 |

2002

| 10 Years: Broadband RF Throughput Demand | | | |
|---|---|---|---|
| Layer | Data Rate per Unit (Mbps) | # of Units on Broadband RF | Total Demand (Mbps) |
| Critical | | | |
| Generation (3rd Party & Renewable) | 0.398 | 500 | 99 |
| Transmission Substations | 1.01 | 50 | 51 |
| Distribution Substations | 0.059 | 600 | 35 |
| Distributed Automation Remotes | 0.011 | 6,185 | 66 |
| AMI | 0 | 4,100 | |
| Mobile Workers | 0 | 800 | |
| HAN | 0 | | |
| Gas Transmission and Distribution | 0.003 | 715 | 2 |
| Non-Critical | | | |
| Generation (3rd Party & Renewable) | 0.011 | 500 | 5 |
| Transmission Substations | 0.878 | 50 | 44 |
| Distribution Substations | 0.151 | 600 | 51 |
| Distributed Automation Remotes | 0 | 6185 | |
| AMI | 1.155 | 4100 | 4734 |
| Mobile Workers | 0.308 | 800 | 247 |
| HAN | 0.3 | | |
| Gas Transmission and Distribution | 0 | 715 | |
| Critical Throughput Demand | | | 353 |
| Non-Critical Throughput Demand | | | 5121 |
| Total Throughput Demand on | | | 5474 |
| Total Throughput Demand on elecom Links | | | 61998 |

FIG. 20A

10 Years: Analysis of Dimensioned Traffic Demand vs Network Capacity — 2003

| | | 1.4 MHz Channel Network Dimensiond Capacity (Mbps) | | | | | | 3 MHz Channel Network Dimensiond Capacity (Mbps) | | | | | |
|---|---|---|---|---|---|---|---|---|---|---|---|---|---|
| | | Download | | | Uplink | | | Download | | | Uplink | | |
| | | Peak | Average | Peak | Average | | | Peak | Average | Peak | Average | | |
| | | 40075 | 99108 | 18216 | 6831 | | | 77484 | 15497 | 38742 | 11623 | | |
| Critical-Only Throughput (Mbps) 353 | Demand Met? | Yes | Yes | Yes | Yes | | | Yes | Yes | Yes | Yes | | |
| | Spare Capacity (Mbps) | 39722 | 8755 | 17863 | 6478 | | | 77131 | 15144 | 38389 | 11270 | | |
| | Spare % | 99% | 96% | 98% | 95% | | | 100% | 98% | 99% | 97% | | |
| | % Change in Demand Supported | | 1835% | | | | | | 3192% | | | | |
| Total Throughput (Mbps) 353 | Demand Met? | Yes | Yes | Yes | Yes | | | Yes | Yes | Yes | Yes | | |
| | Spare Capacity (Mbps) | 39722 | 8755 | 17863 | 6478 | | | 77131 | 15144 | 38389 | 11270 | | |
| | Spare % | 99% | 96% | 98% | 95% | | | 100% | 98% | 99% | 97% | | |
| | % Change in Demand Supported | | 1835% | | | | | | 3192% | | | | |
| | Guard Band Amount (Mhz) | 1.1 | | | | | | 1.3 | | | | | |
| | Spectrum Required (Mhz) | 5 | | | | | | 8.5 | | | | | |

FIG. 20B

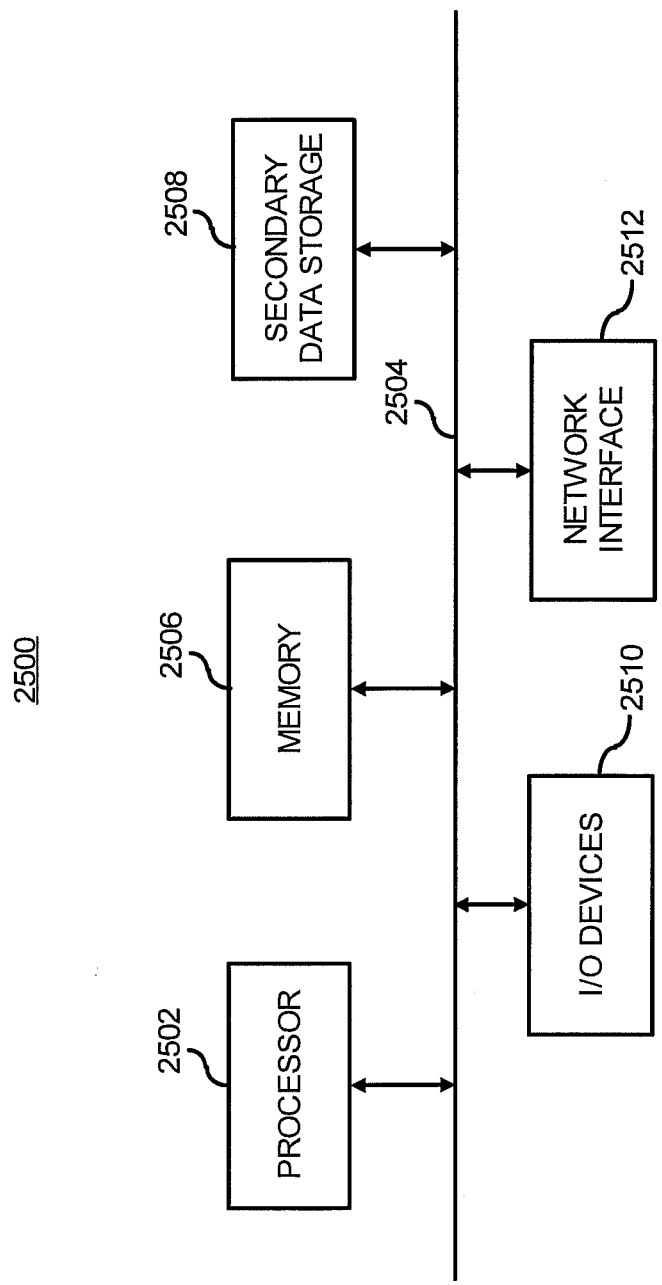

SMART GRID DEPLOYMENT SIMULATOR

PRIORITY

The present application is a continuation-in-part of U.S. patent application Ser. No. 12/434,167, which has a priority date of May 1, 2008 and is incorporated by reference in its entirety.

BACKGROUND

Various industries have networks associated with them. One such industry is the utility industry that manages a power grid. The power grid may include one or all of the following: electricity generation, electric power transmission, and electricity distribution. Electricity may be generated using generating stations, such as a coal fire power plant, a nuclear power plant, etc. For efficiency purposes, the generated electrical power is stepped up to a very high voltage (such as 345K Volts) and transmitted over transmission lines. The transmission lines may transmit the power long distances, such as across state lines or across international boundaries, until it reaches its wholesale customer, which may be a company that owns the local distribution network. The transmission lines may terminate at a transmission substation, which may step down the very high voltage to an intermediate voltage (such as 138K Volts). From a transmission substation, smaller transmission lines (such as sub-transmission lines) transmit the intermediate voltage to distribution substations. At the distribution substations, the intermediate voltage may be again stepped down to a "medium voltage" (such as from 4K Volts to 23K Volts). One or more feeder circuits may emanate from the distribution substations. For example, four to tens of feeder circuits may emanate from the distribution substation. The feeder circuit is a 3-phase circuit comprising 4 wires (three wires for each of the 3 phases and one wire for neutral). Feeder circuits may be routed either above ground (on poles) or underground. The voltage on the feeder circuits may be tapped off periodically using distribution transformers, which step down the voltage from "medium voltage" to the consumer voltage (such as 120V). The consumer voltage may then be used by the consumer.

Power companies may manage the power grid, including managing usage, faults, maintenance, and upgrades related to the power grid. However, the management of the power grid is often inefficient and costly. For example, a power company that manages the local distribution network may manage faults that may occur in the feeder circuits or on circuits, called lateral circuits, which branch from the feeder circuits. The management of the local distribution network often relies on telephone calls from consumers when an outage occurs or relies on field workers analyzing the local distribution network.

In order to mitigate inefficiencies with management of the power grid, power companies have attempted to upgrade the power grid using digital technology, sometimes called a "smart grid." A smart grid is an intelligent network that may use one or more of sensing, embedded processing, digital communications, and software to manage network-derived information. For example, more intelligent meters (sometimes called "smart meters") are a type of advanced meter that identifies consumption in more detail than a conventional meter. The smart meter may then communicate that information via a network back to the local utility for monitoring and billing purposes (telemetering). Through smart meters and other infrastructure, the smart grid may include capabilities to support major business functions including power delivery, asset management, and customer experience enablement.

Although upgrading to a smart grid may greatly improve efficiency and reduce costs in the long run, the challenge and costs of upgrading to a smart grid are not trivial. For example, power companies may be faced with questions such as how will existing and emerging technologies impact the wired and wireless network infrastructure needed for smart grid; how much bandwidth, including wireless spectrum, will be required to support the business in the future; what are the capital and operational costs to build, upgrade and maintain the network based on business and technology forecasts. Without accurate answers to these questions, the power company may not be able to accurately estimate upgrade costs, which can lead to extensive budget overruns. Also, the capacity of the infrastructure of the smart grid may be insufficient if traffic is underestimated or the infrastructure may be substantially over-provisioned.

SUMMARY

According to an embodiment, a decision management system simulates a smart grid communications network service deployment using business and technology changeable parameters, models describing traffic profiles for smart grid domain devices and smart grid applications, smart grid infrastructure and a cost model. Candidate solutions for deploying the smart grid service are determined for different sets of changeable parameters through the simulations. These solutions are analyzed to identify a solution for deploying the smart grid service.

According to an embodiment, a method for simulating and analyzing one or more scenarios for a smart grid communications network service to be deployed includes receiving business and technology changeable parameters for the smart grid communications network service to be deployed. The method may further include simulating, e.g., by a processor, the smart grid communications network service using the changeable parameters, device models describing traffic profiles for smart grid domain devices and smart grid applications, and a cost model to determine at least one candidate solution for deploying the service. The at least one candidate solution may include smart grid domain devices and a smart grid application for deploying the smart grid communications network service, estimated bandwidth needed for the smart grid communications network service and estimated costs for the smart grid communications network service. The method may include generating an analysis of the at least one candidate solution to evaluate an impact of the changeable parameters.

The method may be embodied as machine readable instructions stored on a computer readable storage medium that are operable to be executed by a processor to perform the method.

BRIEF DESCRIPTION OF DRAWINGS

The embodiments of the invention will be described in detail in the following description with reference to the following figures.

FIG. 1A illustrates a network environment for a decision management system, according to an embodiment;

FIG. 4 illustrates an analysis report of a candidate solution, according to an embodiment;

FIG. 6 illustrates examples of communications network technologies that may be used in domains and utility sections of a smart grid, according to an embodiment;

FIG. 7 illustrates examples of business and technology inputs and candidate solution outputs for the decision management system, according to an embodiment;

FIGS. 10A-D show examples of estimations for required bandwidth and technology mix for smart grid services in text form, according to an embodiment;

FIGS. 11A-B shows examples of traffic profiles in device models for devices and smart grid applications, according to an embodiment;

FIGS. 12A-B show examples of device models and their communication characteristics (e.g., current and future) that may be used for a smart grid service for a transmission substation utility section of a smart grid, according to an embodiment;

FIGS. 13A-B show examples of device models and their communication characteristics (e.g., current and future) that may be used for a smart grid service for a gas transmission substation, according to an embodiment;

FIGS. 14A-B show examples of device models and their communication characteristics (e.g., current and future) that may be used for a smart grid service for the distribution substations utility section, according to an embodiment;

FIGS. 15A-B show examples of device models and their communication characteristics (e.g., current and future) that may be used for electrical distribution circuits, according to an embodiment;

FIGS. 16A-B show examples of device models and their communication characteristics (e.g., current and future) that may be used for a smart grid service for the distributed generator utility section, according to an embodiment;

FIG. 17 shows examples of device models and their communication characteristics (e.g., current and future) that may be used for PHEV (plug-in hybrid electric vehicles), according to an embodiment;

FIGS. 18A-B show examples of device models and their communication characteristics (e.g., current and future) that may be used for a smart grid service for automated meter reading and the home/customer utility section, according to an embodiment;

FIG. 19 shows examples of device models and their communication characteristics (e.g., current and future) that may be used for a smart grid service for the mobile IT utility section; according to an embodiment;

FIGS. 20-22 show examples of screenshots that may be generated through a user interface of the decision management system, according to an embodiment;

FIG. 25 illustrates a computer system that may be used as a platform for the decision management system and executing various functions, according to an embodiment.

DETAILED DESCRIPTION OF EMBODIMENTS

Figure 1B:
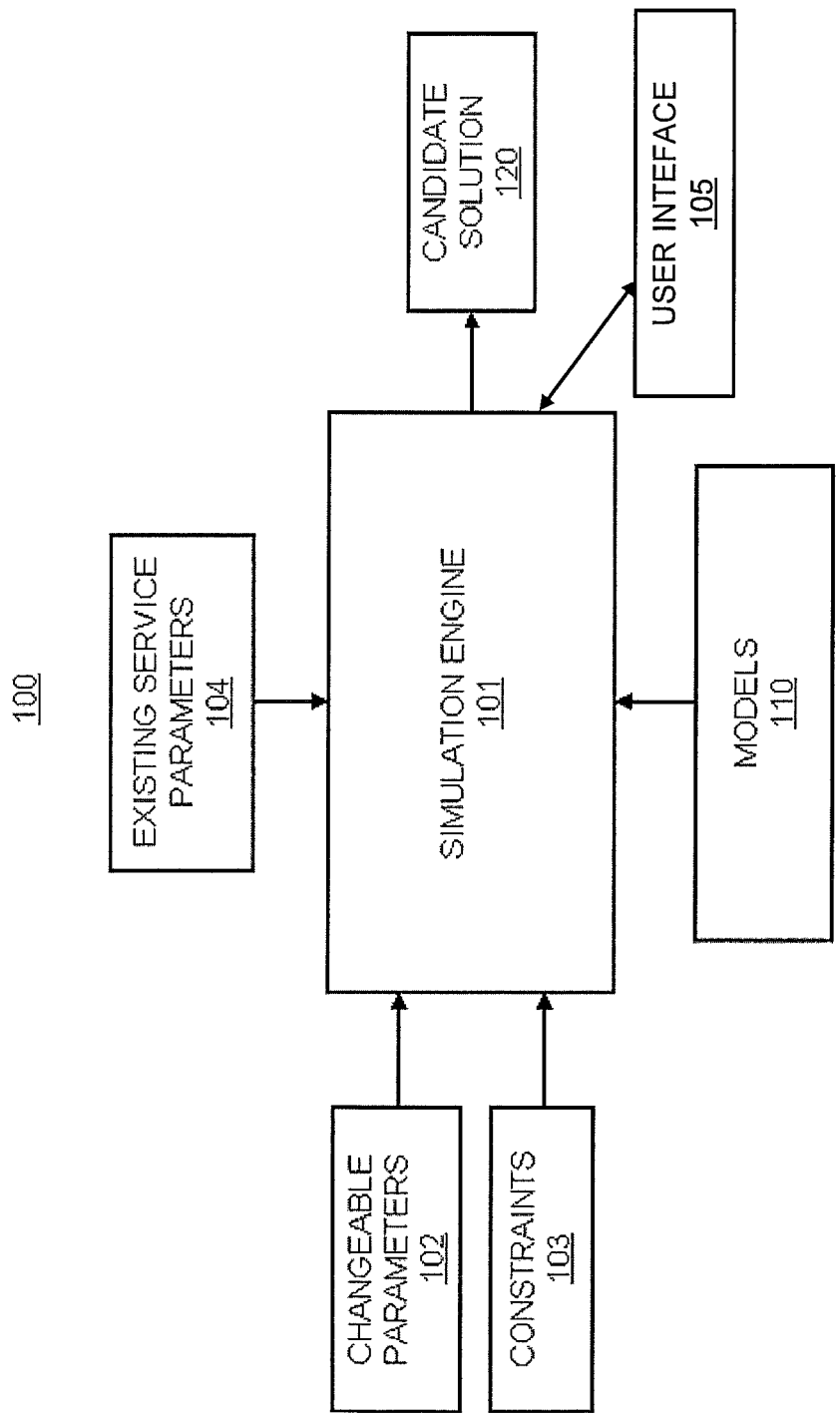
FIG. 1B illustrates the decision management system, according to an embodiment.

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

According to an embodiment, a decision management system uses quantitative methods and changeable parameters to simulate and analyze different communication network service deployments for a smart grid. The simulations and analysis may then be used to identify optimal service deployment scenarios to maximize business as well as technological objectives. Also, the decision management system may be used by companies or other entities to strategize about their existing network investments while simultaneously deploying new technologies and services.

A service includes the supplying or providing of information over a network, and is also referred to as a communications network service. According to an embodiment, these services include smart grid services. The smart grid services may include person-to-person services, such as voice communications, video, and mobile and stationary person-to-person services. Another example of smart grid services are enterprise services, such as messaging, unified communications and collaboration, telepresence, ubiquitous access to applications, remote access and security, and mobility. Another example of smart grid services are machine-to-machine services, such as sensors and telemetry (e.g., smart metering), fleet tracking and monitoring, and asset tracking and monitoring. Another example of smart grid services are customer-facing services, such as web and mobile access to account management, portal-based services, and collaborative interaction. The decision management system may be used to simulate and analyze different service deployments for these services and other types of services related to smart grid.

The decision management system includes a scenario-based simulator to simulate different scenarios encompassing different changeable parameters or variables for services to be deployed. The simulator uses a multi-linear simulation engine to run simulations for different scenarios. The output of the simulator includes an analysis of each scenario and an analysis of business and technology sub-solutions for each simulation. A solution includes an analysis of different factors for deploying a service given changeable parameters, constraints, and existing service parameters, if any. Sub-solutions provide an analysis of different categories of the factors. For example, a business sub-solution includes an analysis of business factors. A technology sub-solution includes an analysis of technology factors. The simulations are operable to take into consideration existing implementations of infrastructure, operations and services, and can be used to evaluate the impact on the existing services.

The decision management system can provide a complete, holistic, end-to-end analytic and support solution that helps companies engage in sophisticated modeling and "what-if" planning based on different business, technology and cost variables. The decision management system is operable to consider business cost variables, operational cost variables, and technological variables, and provides a comprehensive analysis across different domains as well as an indication of how the variables in the different domains impact each other. A domain is a logical sectioning of a service. In one example, domains of a 4G (4$^{th}$ Generation Broadband Wireless) service include a radio domain, a backhaul domain, a core network domain, and an operations domain. Domains of a smart grid service include utility sections, devices, local area network (LAN) (wired and/or wireless), a backhaul domain, a wide area network (WAN) domain, head-end domain and an operations domain. Changes in one domain may impact changes in another domain, which is captured in the modeling described herein. This type of decision management system is invaluable for communications providers to get a complete picture and understanding of costs and potential profits for service deployments, as well as providing practical guidelines and what-if analysis for evaluating various network solutions. Furthermore, the decision management system can provide analysis of different scenarios in real time. Thus, the impact of changing different variables in different domains to achieve a business objective can be quickly evaluated.

Some examples of the analytics and performed by the decision management system includes estimating network traffic projections. The estimations may include network traffic modeling based on critical versus non-critical traffic, busty versus continuous traffic, and cell site-by-site characteristics. The estimations may include radio frequency comparison, including WiMAX (Worldwide Interoperability for Microwave Access) versus LTE (Long Term Evolution). The system may also provide network deployment planning, including generating a network deployment view over a time period, such as a ten-year period. The planning may include estimating capital and operational expenditures, including design, build, and run costs, over the time period. The analytics may be used to determine an acceptable use of private versus public leased communications.

FIG. 1A illustrates a network environment for a decision management system 100. The decision management system 100 may be implemented on one or more servers, each including computer hardware such as processors and memory. The decision management system 100 may be connected to a data storage system 120 and a web server 130. Users 155 may connect to the decision management system 100 via network 150 and web server 130. The web server 130 manages user requests and sends responses from the decision management system 100 to the users 155. The data storage system 120 may include a database or other type of data storage system. The data storage system 120 stores any data used by the data management system 100 to perform its functions. The dashed line represents network security, such as a firewall. The decision management system 100, data storage system 120 and web server 130 may sit behind a firewall to prevent unauthorized access to the systems.

FIG. 1B illustrates the decision management system 100, according to an embodiment. The decision management system 100 includes a simulation engine 101, and models 110. The simulation engine 101 receives inputs, including one or more of changeable parameters 102, constraints 103, and existing service parameters 104, that may be entered by a user via a graphical user interface. From these inputs and the models 110, the simulation engine 101 simulates the deployment of a communications network service. The simulation engine 101 generates an analysis of the simulation, which is shown as candidate solution 120. A candidate solution is a solution that may be selected to be used to deploy the service. Multiple candidate solutions can be determined and one may be selected for deploying the service. For example, the changeable parameters 102 may be varied, for example by a user, to generate different candidate solutions. Each candidate solution can be analyzed to determine the solution that best satisfies one or more objectives. One or more reports may be generated for each candidate solution that presents an analysis of the candidate solution. A user may compare the analyses of each candidate solution. For example, a solution may be selected that minimizes costs but provides the best customer experience based on quality of service (QoS) or Radio Frequency (RF) coverage constraints related to technology.

The constraints 103 may include requirements that must be met by the deployed service. One example of a constraint is a QoS constraint. Another constraint may be a budget constraint. The existing service parameters 104 describe existing network infrastructure and services, if any. The deployment of a new service may impact or be impacted by existing network infrastructure and services. For example, a new service may be cheaper to implement when largely supported by the existing network infrastructure. In another example, existing operations, such as customer help desk or technicians, may be leveraged to support new services. The decision management system 100 may include a user interface 105, which may be a graphical user interface. Through the user interface 105, the users 155 shown in FIG. 1A may provide information, such as changeable parameters 105, constraints 103, existing service parameters 104 to the decision management system 100. Also, simulation results, including the candidate solution 120, may be presented to the users 155 via the user interface 105.

As described in more detail below, the models 110 take into consideration business and technology factors across multiple domains that can be used to simulate deploying of a smart grid service. These factors are implemented in the models, and these factors when implemented in the models are referred to as model parameters. Relationships, described below, between the model parameters are used during the simulations to generate the candidate solutions for deploying the service. Deploying of a service may include building network infrastructure, providing the service, and maintaining the service after it is operational.

The models 110 include different business and technology model parameters that may be derived from a historical analysis of various communication network service deployments, and also may be derived from a determination of the type of information that is needed to analyze deployment of a service. For example, if a particular type of equipment is needed for a service deployment, then cost of that equipment may be used as a model parameter. The model parameters may include but are not limited to traditional types of costs and traditional technology variables that affect the service.

Models may be provided based on domain. A model may include model parameters that are associated with one domain or mostly associated with one domain. However, models do not need to be based on domain.

The simulation generates values for the model parameters. A value for a model parameter is an instance of the model parameter. For example, if a model parameter is capital cost for equipment, then a value for that factor is a monetary amount, such as 28.3 million dollars. The values determined for the factors are estimations based on relationships between the model parameters as well as inputs, such as the changeable parameters and/or other inputs for the simulation. As used herein, model parameters that are related are referred to as dependent model parameters. If a model parameter is dependent on another model parameter in the same or a different model, those model parameters may also be referred to as corresponding parameters that are dependent.

The relationships between dependent model parameters are stored in each of the models, and these relationships may be stored as relationship curves or some other type of mapping. A curve can describe the relationships between dependent model parameters. For example, a curve may capture that if a value of a dependent model parameter exceeds a threshold, then the value for the corresponding dependent model parameter may level off and maintain a certain value even if the other dependent model parameter continues to get larger. Examples of relationships are described in further detail below. Note that the values in the curves may be derived from a historical analysis of the model parameters. Also, note that the relationships in the models may be between one or more inputs to the simulation engine 101 and one or more model parameters. Additionally, relationships may exist between more than two model parameters, and relationships may be dependent on other relationships. Also, relationships may be between different domains.

Examples of the models may include a base case model, a network model and a bandwidth model. These models may be used for simulating 4G services, smart grid services or other types of network communication services. The base case model is for analyzing both capital and operational costs. Examples of values for capital cost include labor rates and capital costs for building and operating the network to provide the communications network service. The operation costs estimate the ongoing costs of running the service. These costs are based on the operational aspect of the service, such as labor rates for end-user customer support and network infrastructure maintenance personnel. Material costs may include cost of replacement equipment. Operational costs include the costs of IT support systems such as network management systems and customer billing systems. These values may vary depending on the type of technology selected for deploying the service.

The network cost model is used to estimate the expenditures associated with building the network for providing the service. The network cost model may include values that impact capital and operational costs in the base case model. Examples of costs in the network cost model for a wireless service include radio costs, such as cell site costs, backhaul costs, which are related to infrastructure costs from the core network to the edge (e.g., cell sites), and core network costs, such as switches and building space.

The bandwidth model helps estimate network bandwidth requirements for the service or combinations of services, such as voice, data and video services. The bandwidth model is especially useful for these type of services, because each of these types of services offers a different profile from a capacity, a coverage and a performance standpoint. Operators can factor findings from this analysis into their network cost model to provide a more detailed picture of build-out costs. Based on the expected bandwidth demand, the bandwidth model helps set the dimensions of the transport network and predicts yearly bandwidth costs. For example, the bandwidth model is used to determine bandwidth needed based on coverage area, number of customers, type of service, and other values.

Other examples of models, which may be used for simulating smart grid services, include device models, traffic models for the devices, domain models and aggregation models. These models may include characteristics of the devices that can be used in smart grid services. The characteristics may include the device name, type, power usage, etc. The domain models may identify changes in characteristics of a device depending on the domain, geography and service for which the device is deployed. The traffic models may specify for each device the number of bytes it transmits, how often it transmits, which protocol it uses, and the latency. The aggregation models may specify how to aggregate bandwidth for the devices to determine the amount of bandwidth needed in each domain, service and geographic location. Cost models may be used to estimate costs. The base case model, a network model and a bandwidth model may also be used for modeling smart grid services, which may include wireless smart grid services.

The models described above identify relationships between domains as well as relationships between different model parameters in different models. These relationships are stored in the models. The simulation engine 101 uses the relationships to generate the candidate solution 120. Furthermore, as a result of varying one or more of the changeable parameters 102, these relationships may identify changes to different costs associated with different models, and ultimately are used to generate different candidate solutions.

Figure 2:
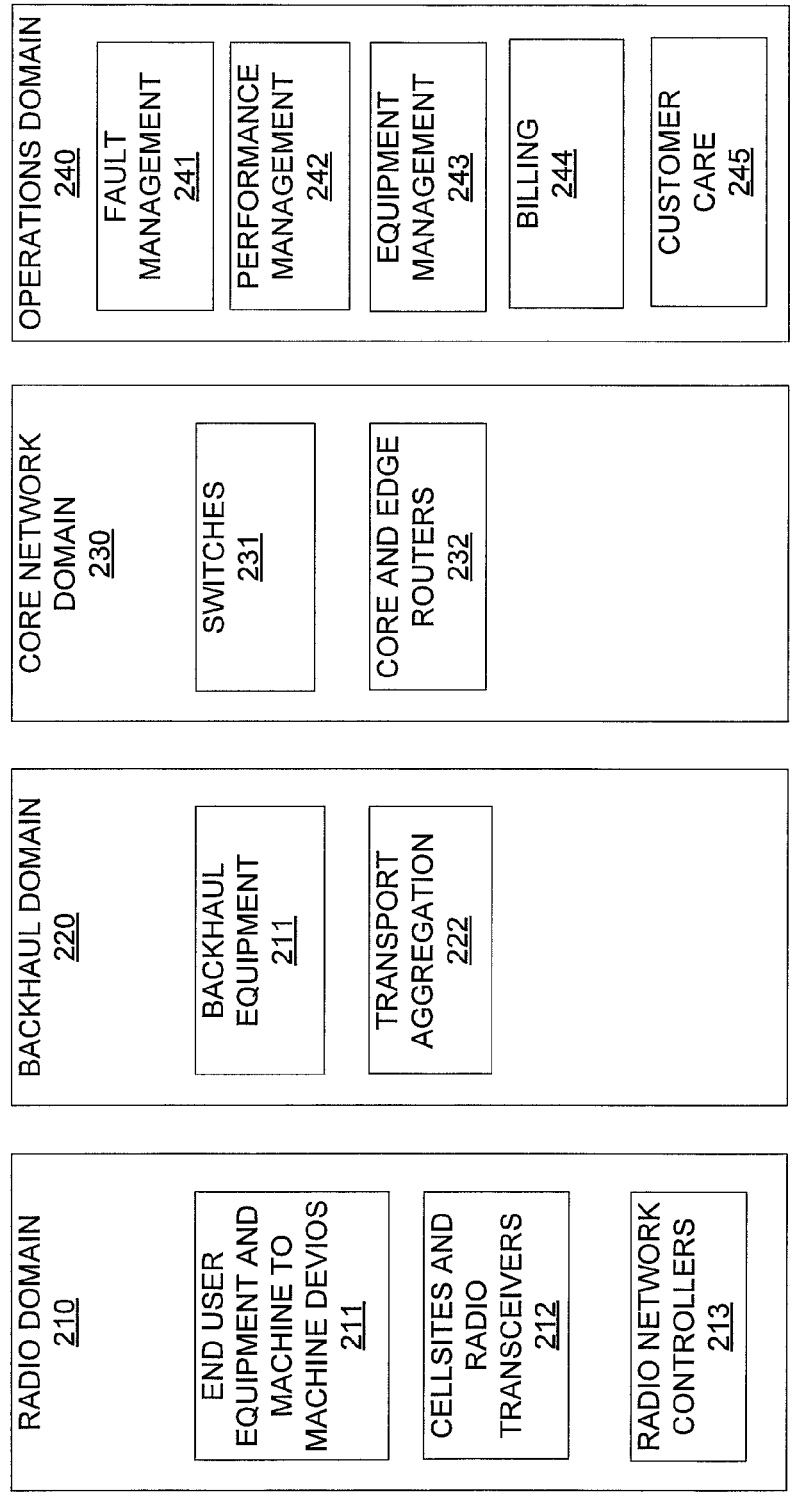
FIG. 2 illustrates domains in a communications network service, according to an embodiment.

FIG. 2 shows different domains for a communications network service deployment. In this example, the service being deployed is a service that needs a wireless cellular network as well as a backhaul and core network (e.g., WAN) with connections to the Internet. The service may include a 4G service providing multimedia applications to the user via a 4G network. The domains include a radio domain 210, a backhaul domain 220, a core network domain 230, and an operations domain 240. The radio domain 210 may include end user equipment and machine-to-machine devices 211 with a cellular interface, such as cell phones, laptops, etc. The radio domain 210 may also include cell sites and radio transceivers 212 and radio network controllers 213. The backhaul domain 220 includes backhaul equipment 221 and transport aggregators 222. This may include controllers and cabling, such as optical fiber carrying data between the cellular network and the core network. The core network domain 230 includes switches 231 and core and edge Internet Protocol (IP) routers 232. The switches and routers may include nodes commonly used for 2G, 3G and 4G wireless systems for transmitting voice, IP packets, and narrowband and broadband traffic. The operations domain 240 may include multiple network and IT support systems, such as a fault management system 241, a performance management system 242, an equipment provisioning system 243, a billing system 244, and a customer care system 245, as well as equipment and personnel needed for each system and aspect of operations.

Figure 3:
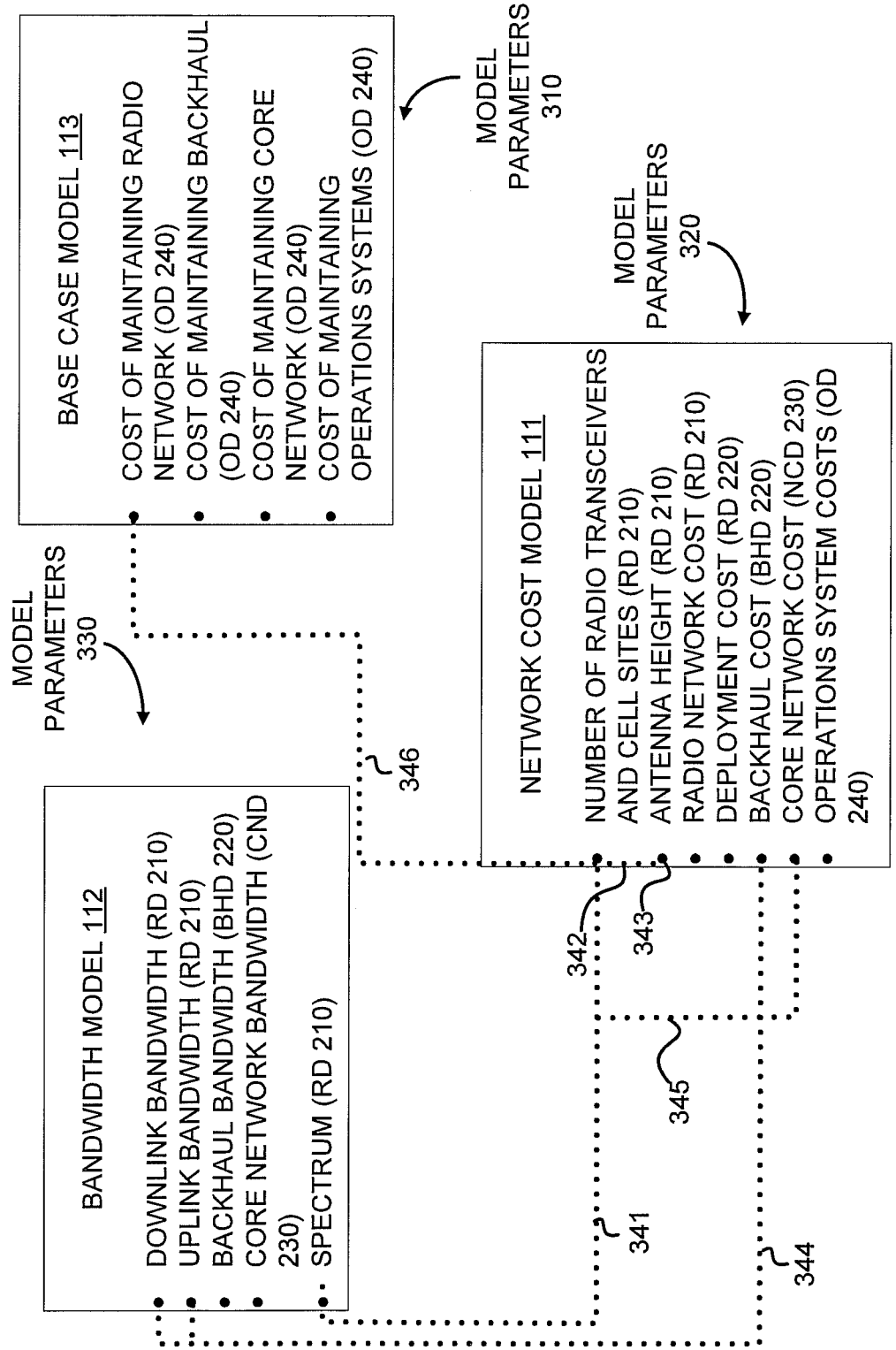
FIG. 3 illustrates relationships between values in models, according to an embodiment.

FIG. 3 shows examples of model parameters 310, 320, and 330 for the base case model 113, network cost model 111 and the bandwidth model 112, respectively, from FIG. 1. FIG. 3 also shows relationships between the model parameters 310-330 in the different models 111-113 and also identifies the domains 210-240 associated with the model parameters. The radio domain 210, the backhaul domain 220, the core network domain 230, and the operations domain 240 are shown in FIG. 3 as RD 210, BHD 220, CND 230, and OD 240, respectively, for each of the model parameters 310-330. The changeable parameters 102 shown in FIG. 1B may identify an end user coverage area to receive the 4G service, an estimated number of users in various areas in the coverage area, and may also identify a downlink bandwidth of 124 kbps, as an example, to the end user. Based on these parameters, the simulation engine 101 uses the bandwidth model 112 to identify bandwidth requirements for the domains. The downlink bandwidth was provided in this example as a changeable parameter, and is shown as a model parameter for the bandwidth model 112. In another example, the downlink bandwidth as well as an uplink bandwidth may be estimated by the simulation engine 101 based on the type of service being deployed and other factors. Another model parameter for the radio domain is the total spectrum required. If less spectrum is available, then more cell sites may be needed to account for demand.

Other model parameters determined using the bandwidth model 112 may include bandwidth needed per channel for the backhaul domain 220 and the core network domain 230. These model parameters may be determined based on the bandwidth requirements for the type of service being deployed, the number of end users, and other factors.

The model parameters 320 for the network cost model 111 may include number of radio transceivers and cell sites, radio network cost, and deployment cost, which can vary depending on whether the site is co-located with another site or a new build, backhaul cost, core network cost and Operational systems costs. Relationships between different model parameters in the models are shown as lines connecting the values. For example, relationship 341 shows that the number of transceivers and cell sites may vary according to the bandwidth spectrum needed for the service. If less spectrum is available, then more cell sites may be needed to account for demand. Spectrum and number of transceivers and cell sites are referred to as dependent parameters because there is a relationship between the parameters. Also, each dependent parameter has at least one corresponding dependent parameter in a relationship. For example, the number of transceivers and cell sites is a dependent parameter and the spectrum is the corresponding dependent parameter or vice versa.

Relationship 344 indicates a relationship between cell site bandwidth (e.g., uplink and downlink) and backhaul and core network costs. For example, backhaul costs are driven by the cost per megabit (Mb) needed at the site and for the backhaul transport. Core network costs are also driven by the bandwidth needed at the cell site.

Relationships 341 and 344 represent inter-model relationships. Intra-model relationships among model parameters also exist. For example, the backhaul and network costs shown under network cost model 111 may increase as the cell site density increase (shown as relationship 345).

Relationships may be inverse or direct. For example, relationship 342 shown for network cost model 111 is between the number of transceivers and cell sites and the antenna height. This relationship is inverse, because a decrease in antenna height per cell site results in less coverage, and as a result more cell sites are needed. Other relationships are direct. For example, relationship 343 represents that using antennas with greater height increases radio network costs, which may include cost per cell site. It should be noted that relationships, whether inverse or direct, may not be linear. For example, after a certain cell site density is reached, an increase in coverage requirement or an increase in bandwidth requirement may be accommodated by the current cell site density.

The model parameters 310 are for the base case model 113. Examples of the model parameters 310 may include costs of maintaining a radio network including cell sites and transceivers, the backhaul, and core network and a cost of maintaining Operational systems. Relationship 346 represents a relationship between number of transceivers and cell sites and cost of maintaining the radio network. For example, as the number of cell sites increases, maintenance costs may also increase. The costs of maintaining the backhaul and core network may have similar relationships based on the size of the backhaul and core network. Operational systems costs may be related to the number of subscribers.

As shown by the example of relationships 341-346, relationships may be between different model parameters in different models as well as between model parameters in the same model. Relationships may be inverse or direct. Also, the relationships may be between domains. For example, relationship 344 represents a relationship between the radio domain 210 and the backhaul and core network domains 220 and 230. Furthermore, a relationship may be between a single model parameter and multiple model parameters or may be between a first set of multiple model parameters and a second set of multiple model parameters. In addition, the relationship may be a multi-hop relationship. For example, an increase in spectrum requirements may cause an increase in the number of cell sites (e.g., relationship 341), which causes an increase in the cost of maintaining the cell sites (e.g., relationship 346).

The relationships are stored in the models 110-112. Thus, as model parameters in the models or the changeable parameters are varied, the resulting changes to other model parameters are captured by the simulation performed by the simulation engine 101 shown in FIG. 1. Furthermore, the resulting changes are identified in different candidate solutions generated by the simulation engine 101.

As described above, the simulation engine 101 uses curves or other types of mappings (e.g., tables) in the models to estimate values for dependent model parameters. The values in the curves may be substantially fixed or may be changed to improve the accuracy of the simulation. For example, if a model parameter is based on a standard or is vendor-specific, the values for the curves involving that model parameter may not be changed unless the standard changes or the vendor changes. In other instances, the model parameters are not as static. In these instances, data may be retrieved from external sources to determine values for the curve. This may include real-time gathering, such as accessing information on the Internet or accessing public or private databases, to retrieve information that may be pertinent to the dependent model parameters. For example, if a model parameter is an equipment cost, then costs for different equipment manufacturers may be retrieved and averaged to determine values for curves using that model parameter. This type of value updating may improve the accuracy of the simulation because the curves are updated with the most recent information.

The candidate solutions provide an analysis of different factors given the changeable parameters 102, the constraints 103, and existing service parameters 104, if any. The analysis may be presented in reports generated by the simulation engine 101. The reports express values for the model parameters from the models 110-112 and other values, which may be derived from the values in the models 110-112.

FIG. 4 shows a simplistic example of information in a report 400 providing a breakdown of costs for the domains 210-240 of FIG. 2. The changeable parameters in this example are a percentage of area coverage 401 and a percentage of population coverage 402. These changeable parameters may be varied by the user. Although not shown, constraints may be specified.

The report 400 shows the domain 410, the description 420, the capital expenditure (CAPEX) 430, and the operations expenditure (OPEX) 440. The domain 410 includes the radio domain, the backhaul domain, the core network domain, and the operations domain. The description 420 provides a description of the costs for each domain. The CAPEX 430 shows the capital expenditure costs for each domain. The OPEX 440 shows the operational costs for each domain estimated for a 5 year run rate. Examples of other information that may be provided in the report include but are not limited to an estimation of consolidated financials and valuation of products and services, subscriber penetration projections, and revenue estimations.

A user may vary the changeable parameters to generate different candidate solutions. For example, a service provider is weighing different market penetration scenarios as well as different bandwidth requirements to help determine an optimal wireless broadband networking strategy. The decision management system 100 generates candidate solutions in real-time projecting business results for a 4 percent market penetration versus a 2 percent penetration. The service provider also assesses the cost impacts of different network speeds, such as a 124 kbps downlink versus a 64 kbps downlink. The candidate solutions help determine the impact of different strategic and technological options based on a five or ten-year cost structure and on a net present value. The decision management system 100 provides decision-making confidence across multiple business and technology dimensions.

For a 4G service, the decision management system 100 may also be used to sort through the pros and cons of a variety of different access technologies, which enables the analysis of strengths and weaknesses in a company's existing technology infrastructure. The system 100 can be used as a planning tool to create the most cost-effective and integrated approach to a company's business support systems and operations support systems.

Filters may also be used to generate reports with the desired model parameters. A filter filters out the model parameters that are not needed for the report. For example, a chief technology officer may need to focus on model parameters in a technology sub-solution. A filter can be used that generates a report including only model parameters related to the technology sub-solution for the service deployment. Reports can be customized with the desired model parameters as needed.

Figure 5:
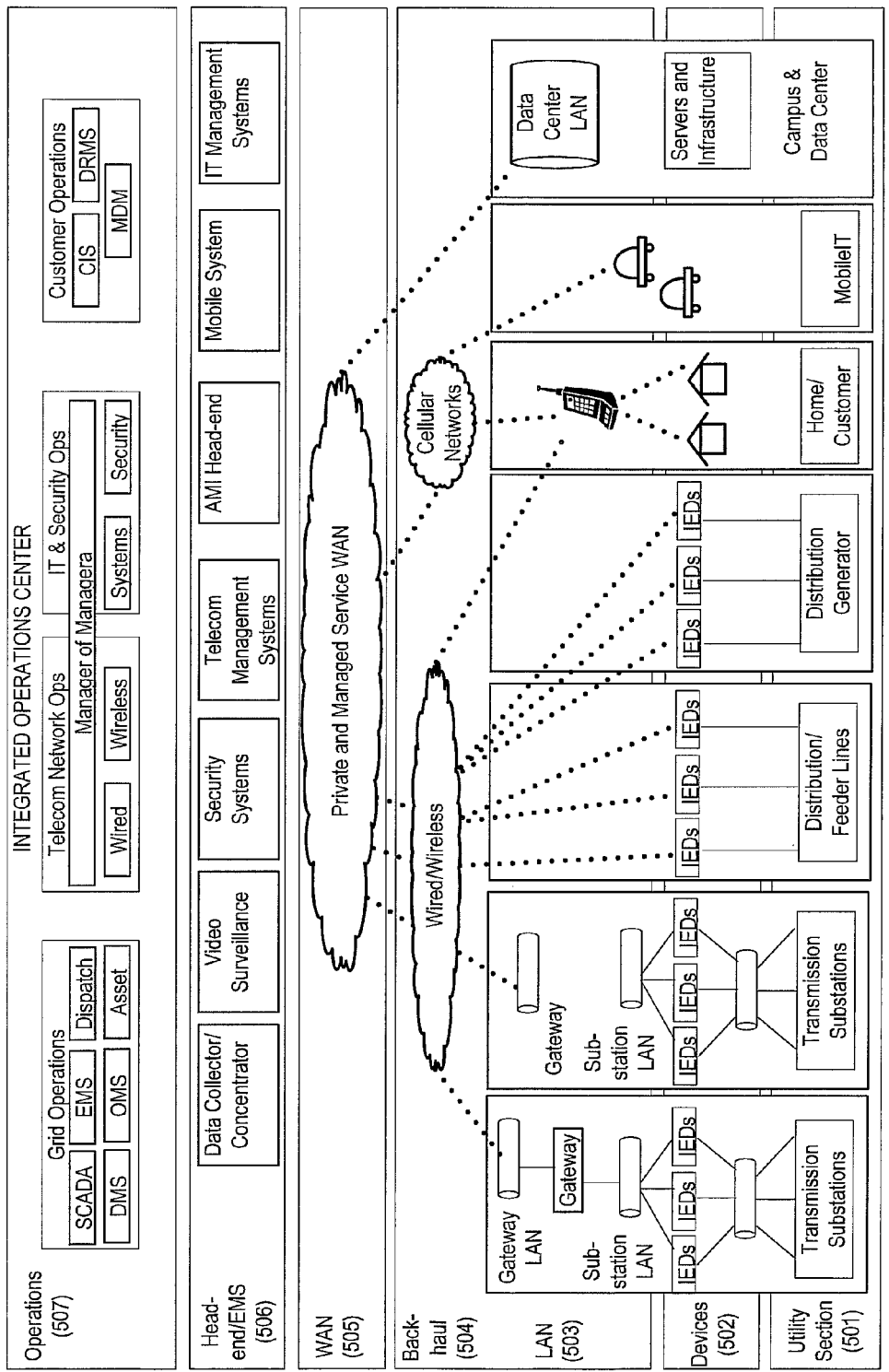
FIG. 5 illustrates a hierarchal model of a smart gird including domains and utility sections, according to an embodiment.

FIG. 5 illustrates network domains for smart grid services. The domains, for example, include utility sections 501, devices 502, LAN 503, backhaul 504, WAN 505, head-end/EMS 506 and operations 507. FIG. 5 also shows networked systems and devices for each utility section. For example, the transmission substations utility section includes process busses, intelligent electronic devices (IEDs) gathering and aggregating data for substations, and LANs and gateways. The data gathered from IEDs and other devices and sensors may be aggregated and transmitted to upstream domains by the LANs and gateways through the smart grid communication network services. The data transmission between domains is not limited to the upstream direction and may also include downstream data transmission. For example, data may be transmitted from upper-level domains, such as the operations domain 507 to the devices domain 502. The data exchanged between the transmission substations utility section and the other utility sections via the smart grid communication services and other domains is represented by the dashed lines.

The distributed substations utility section may include devices and LANs similar to the transmission substations utility section. The distribution/feeder lines utility section and the distributor generator utility section may also include IEDs gathering and sending data regarding the power distribution. The home/customer utility section, the mobile IT and the campus and data center utility section may also communicate through smart grid communication services to other domains.

FIG. 6 shows examples of the different network technologies that may be used for the communications services in the domains and utility sections shown in FIG. 5. For example, as shown in FIG. 6, ZIGBEE, HOMEPLUG, and WiFi are examples of technologies that may be used to gather data from customer smart grid devices. The technologies listed under grid/mobile IT/campus are examples of network technologies that may be used for the distribution substations utility section, the distribution/feeder lines utility section and mobile IT utility section shown in FIG. 5. The technologies listed under WAN in FIG. 6 may be used in the WAN domain 506 shown in FIG. 5 or may be used to communicate with the WAN domain 506. FIG. 6 also shows examples of smart grid applications that may be used in the operations domain 507 shown in FIG. 5.

As described above, the system 100 shown in FIGS. 1A-B is operable to generate candidate solutions for smart grid services. The candidate solutions may include spectrum required, technology mix, public versus private infrastructure mix, and costs including CAPEX and OPEX. To determine the candidate solutions, information about the domains 501-507 and the utility sections shown in FIG. 5 is determined. FIG. 7 shows information that may be input into the system 100, which may be included in the changeable parameters 102, constraints 103 and/or the existing service parameters 104 shown in FIG. 1, to determine the candidate solution 120. FIG. 7 shows scenario inputs 701 that may be provided as the input information for the system 100. The scenario inputs 701 includes business assumptions 702, technology assumptions 703, cost assumptions 704 and spectrum assumptions 705.

The business assumptions 702 may include coverage requirements, capacity requirements, timeframes, service quality and security requirements. Some of this information may be determined from the models 110 (e.g., bandwidth capacity requirements) and may be based on service requirements. The technology assumptions 703 may include wireless technologies, wired technologies, architecture, public versus private networks, technical specifications, protocols and traffic management. The cost assumptions 704 may include company owned costs (e.g., unit, upgrade and maintenance costs, and scaling factors) and public carrier costs. The spectrum assumptions 705 may include frequency bands, licensed versus unlicensed bands, channel size, guard bands and regulatory constraints. One or more of the scenario inputs 701 may be provided by a user or derived from information provided by the user or information provided by other sources.

FIG. 7 also shows scenario outputs 710, which may be included in the candidate solution 120 shown in FIG. 1B to describe the details of the proposed service that is operable to be deployed to meet the user's requirements. The scenario outputs 710 shown in FIG. 7 include spectrum required 711, wireless infrastructure 712, wired infrastructure 713 and costs 714. The spectrum required 711 may include an estimate of spectrum required per year, per frequency band, per and/or per licensed versus unlicensed bands. The wireless infrastructure 712 includes cost and sizing estimates for the wireless infrastructure. The cost and sizing estimates may be organized by utility section, link type, frequency, technology and/or public versus company owned. The wired infrastructure 713 may include similar cost and sizing estimates. The costs 714 may include CAPEX and OPEX costs, which may be organizer per annum and may be aggregated.

The models used to determine the scenario outputs 710 for smart grid services may include device models including traffic profiles for devices and applications in utility sections and domains and cost models. These models may be used to estimate present and future traffic and costs in each domain and each utility section shown in FIG. 5. Furthermore, the estimations may be dependent on data connectivity between the domains and utility sections.

Figure 8:
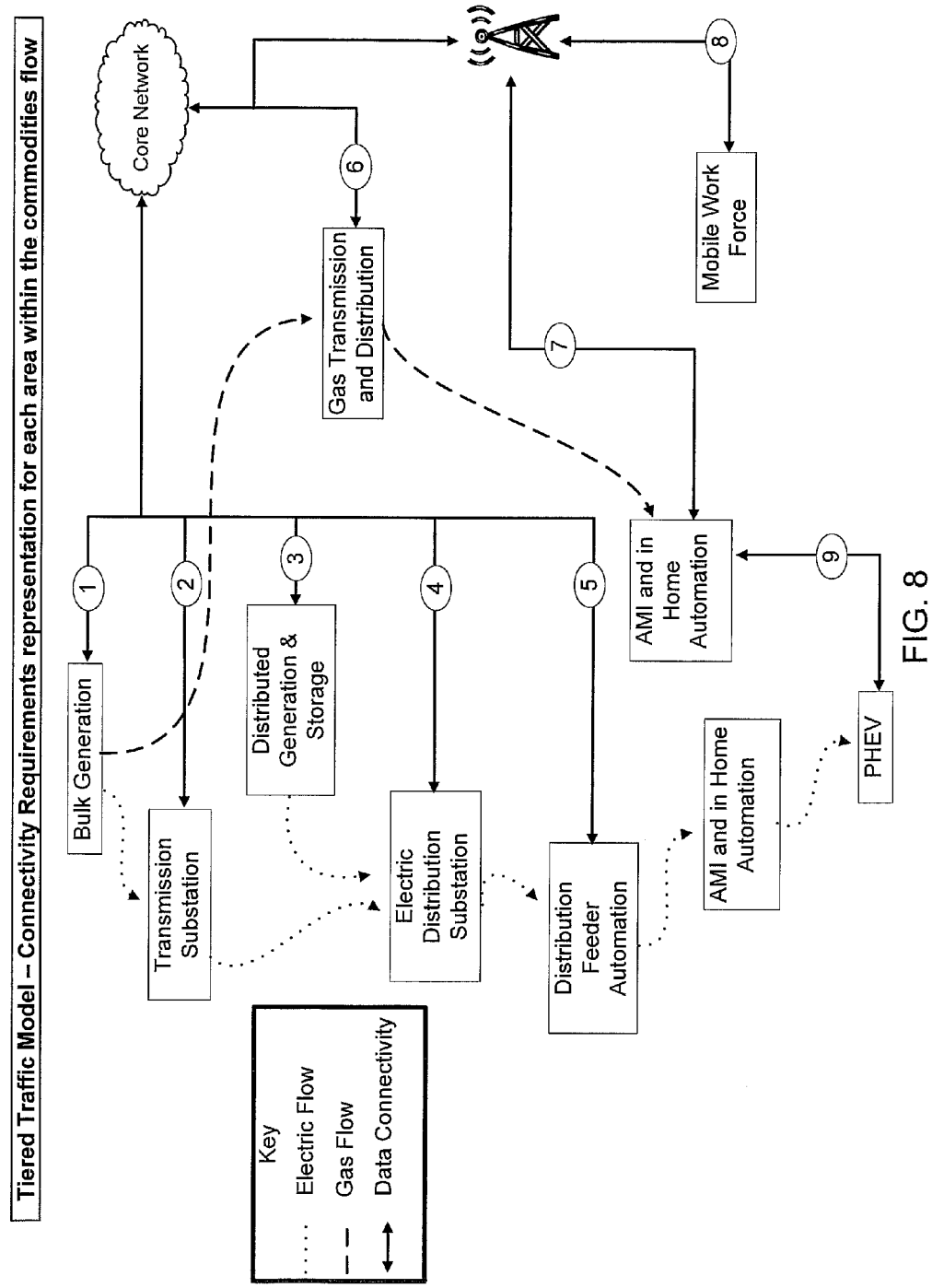
FIG. 8 illustrates an example of hierarchical connectivity between domains for a smart grid service for both the electrical network and the communications network, according to an embodiment.

FIG. 8 shows data connectivity for each utility section and for the domains in smart grid, and shows the commodity flows. The commodity flows include gas and electric flows through the smart grid systems, such as flows from generators and through transmission and distribution substations and feeder lines to the customer. The customer consumes the commodities through appliances and other systems and devices. One example is shown as electric vehicles (e.g., plug-in hybrid electric vehicles (PHEV)) that may eventually become pervasive and consume electricity at the customer premises when being recharged.

The data connectivity for the utility sections and the smart grid domains of FIG. 5 are also shown. FIG. 8 shows that smart grid services may encompass network data connectivity between transmission substations, distribution substations, distribution and feeder lines, customers, mobile workforce and the core network. FIG. 8 includes numbers 1-8 representing the data connectivity for each utility section. For example, 2 represents the data connectivity for the transmission substations, and 4 represents the data connectivity for the electrical distribution substations.

Figure 9A:
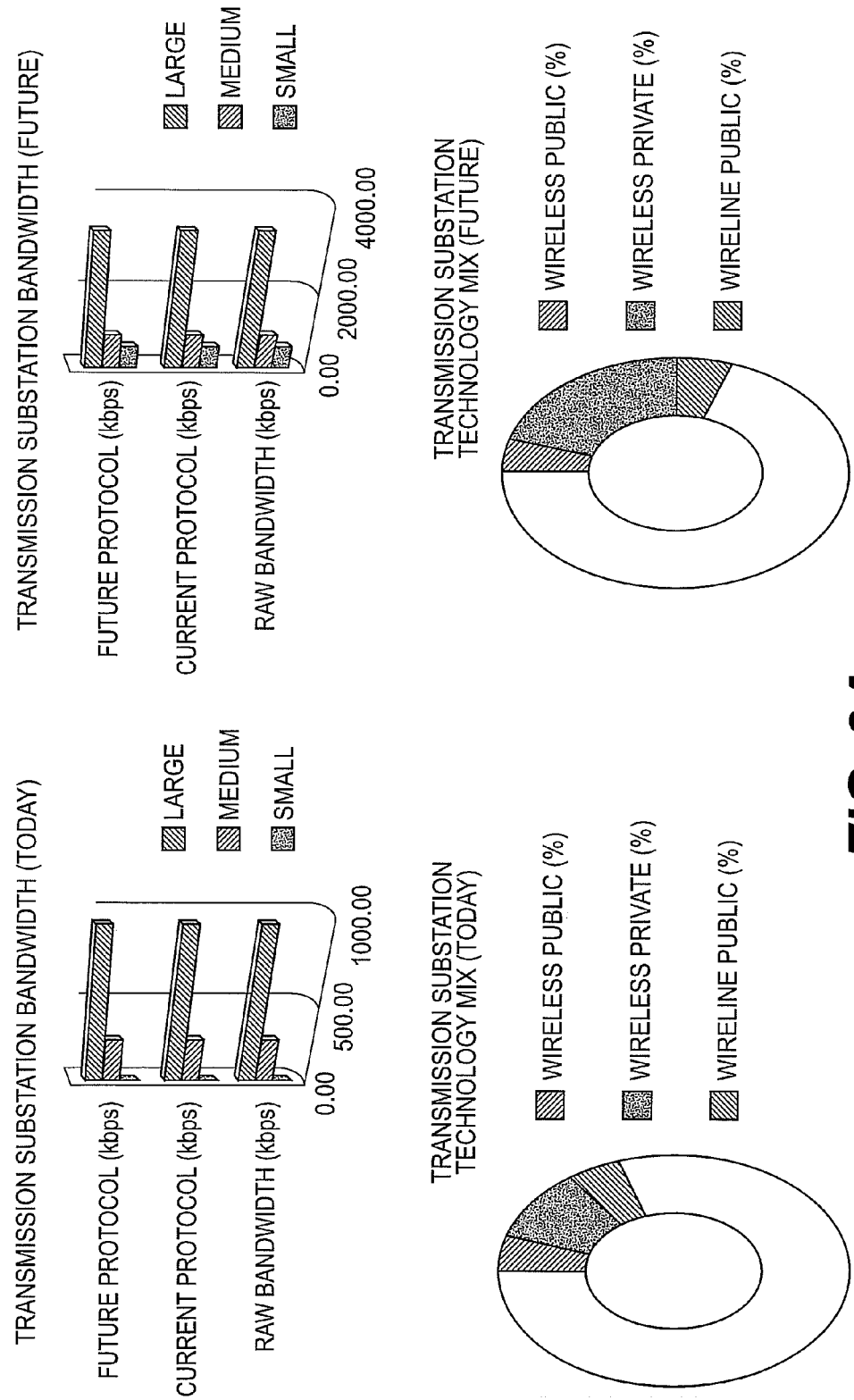
FIGS. 9A-B show examples of estimations for required bandwidth and technology mix for a smart grid service in graphic form, according to an embodiment.

The models take into account the data connectivity shown in FIG. 8 for estimating the bandwidth required, the wireless infrastructure, the wired infrastructure and costs for service deployment, which may be included in a candidate solution. For example, the system 100 shown in FIGS. 1A-B uses the models 110, including smart grid models, to make the estimations. FIG. 9A shows an example of the estimations for the data connectivity for the transmission substations utility section, shown as 2 in FIG. 8. FIG. 9A shows estimations for the required bandwidth that would be needed today and in the future for the smart grid communications network service for the transmission substations utility section. The bandwidth requirements are shown for different package sizes, shown as small, medium and large. A package may include one or more devices. Package size refers to network characteristics of the device. For example, a larger package size may provide more bandwidth or may be able to monitor more devices, and so on. The bandwidth requirements are also shown for current and potential future protocols. FIG. 9A also shows estimations for the transmission substation technology mix that would be needed for today and in the future to implement the service. The technology mix includes the mix of public and private wired and wireless network that may be used for the service.

Figure 9B:
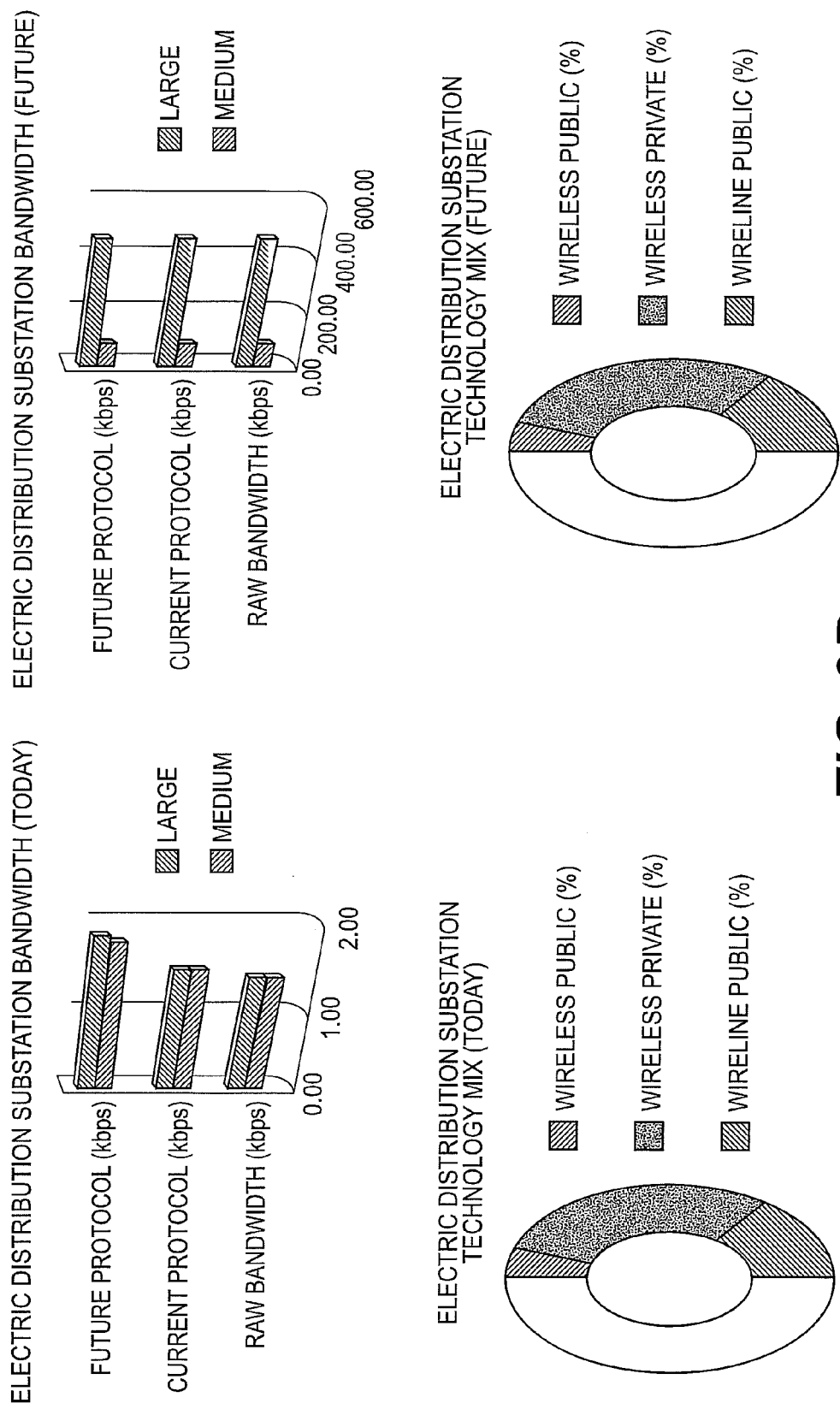

FIG. 9B shows an example of the estimations for the data connectivity for the electrical distribution substations utility section, shown as 4 in FIG. 8. Similar to FIG. 9A, FIG. 9B shows estimations for the required bandwidth that would be needed today and in the future for the smart grid service for this data connectivity. FIG. 9B also shows estimations for the transmission substation technology mix that would be needed for today and in the future to implement the service for this data connectivity and service. Although not shown, the system 100 is operable to provide estimation for the data connectivity for each utility section and domain shown in FIG. 8.

As described above, FIGS. 9A-B show examples of estimations of for required bandwidth and technology mix. FIGS. 9A-B show the estimations in graphic form. FIGS. 10A-D show the estimations in a text form. FIGS. 10A-D shows the estimations for all the utility sections and domains shown in FIG. 8.

FIGS. 11A-B show traffic profiles for device models for smart grid devices and applications that may be used to determine the estimations shown in FIGS. 9A-B and 10A-D and the candidate solution 120 of FIG. 1. The smart grid device models may be included in the models 110 shown in FIG. 1. The traffic profiles may differ depending on the use case, which is also shown. For example, the different use cases might be for using the devices in different utility sections and/or domains, which impacts the traffic profiles as shown in FIG. 11A-B. The traffic profiles are comprised of network characteristics, which may include sample size (bytes), sample rate per unit, sample unit (e.g., seconds, minutes, hours), raw rate (kbps), raw+current overhead rate (kbps), raw+future overhead rate (kbps), and latency (ms). for each monitoring application. Also, protocol overhead may be entered and used to determine the traffic profiles for various devices.

FIGS. 12-18 also show data for device models for different utility section and domains of the smart grid. FIGS. 12A-B show device models for the transmission substations utility section of a smart grid for current and future deployments. In FIGS. 12A-B and other figures, different package sizes that may be implemented for this utility section are shown. Each package size may include different devices and/or applications. For example, in FIG. 12A, video surveillance is shown as included for the large package size but not for the small and medium package sizes. Also, the packages may differ from current and future deployments. For example, for transmission substation 1, video surveillance may additionally be included in future deployment of a smart grid service, which is shown in FIG. 12B. This impacts costs and bandwidth estimations over time, which are presented as part of a candidate solution.

FIGS. 13A-B show examples of device models (e.g., current and future) that may be used for a smart grid service for a gas transmission substation. FIGS. 14A-B show examples of device models (e.g., current and future) that may be used for a smart grid service for the distribution substations utility section. FIGS. 15A-B show examples of device models (e.g., current and future) that may be used for electrical distribution circuits. FIGS. 16A-B show examples of device models (e.g., current and future) that may be used for a smart grid service for the distributed generator utility section. FIG. 17 shows examples of device models (e.g., current and future) that may be used for PHEV. FIGS. 18A-B show examples of device models (e.g., current and future) that may be used for a smart grid service for automated meter reading and the home/customer utility section. FIG. 19 shows examples of device models (e.g., current and future) that may be used for a smart grid service for the mobile IT utility section.

The system 100 shown in FIGS. 1A-B includes the user interface 105. The user interface 105 may include a graphical user interface (GUI) where a user can enter and modify parameters and view simulation results generated by the simulation engine 101. FIGS. 20A-B illustrate an example of a snapshot of a dashboard that maybe presented via the user interface 105. The dashboard allows users to change radio network and spectrum parameters in order to simulate how much spectrum will be required and how much capacity is in the network for up to ten years into the future. The simulation results presented in the dashboard indicate where there is excess capacity or insufficient capacity or spectrum in the network. For example, a user may modify parameters in the window 2001, such as number of cell sites, whether a cell site is split, whether all traffic is loaded on broadband radio frequencies, and other network and spectrum parameters, which may not be shown.

Windows 2002 and 2003 show examples of simulation results for the ten-year period. Window 2002 shows the ten-year throughput demand for critical and non-critical layers in the domains and a total ten-year throughput demand. Window 2003 includes an analysis of traffic demand versus network capacity for the ten-year time period. For example, window 2003 indicates whether the demand is met by the capacity for each channel. The amount of spare capacity is also shown if capacity exceeds demand. If the capacity is insufficient to meet the demand, the user may adjust the parameters, such as number of channels or cell sites, to increase the capacity. If there is too much spare capacity, the user may adjust the parameters to reduce capacity and save costs.

Figure 21:
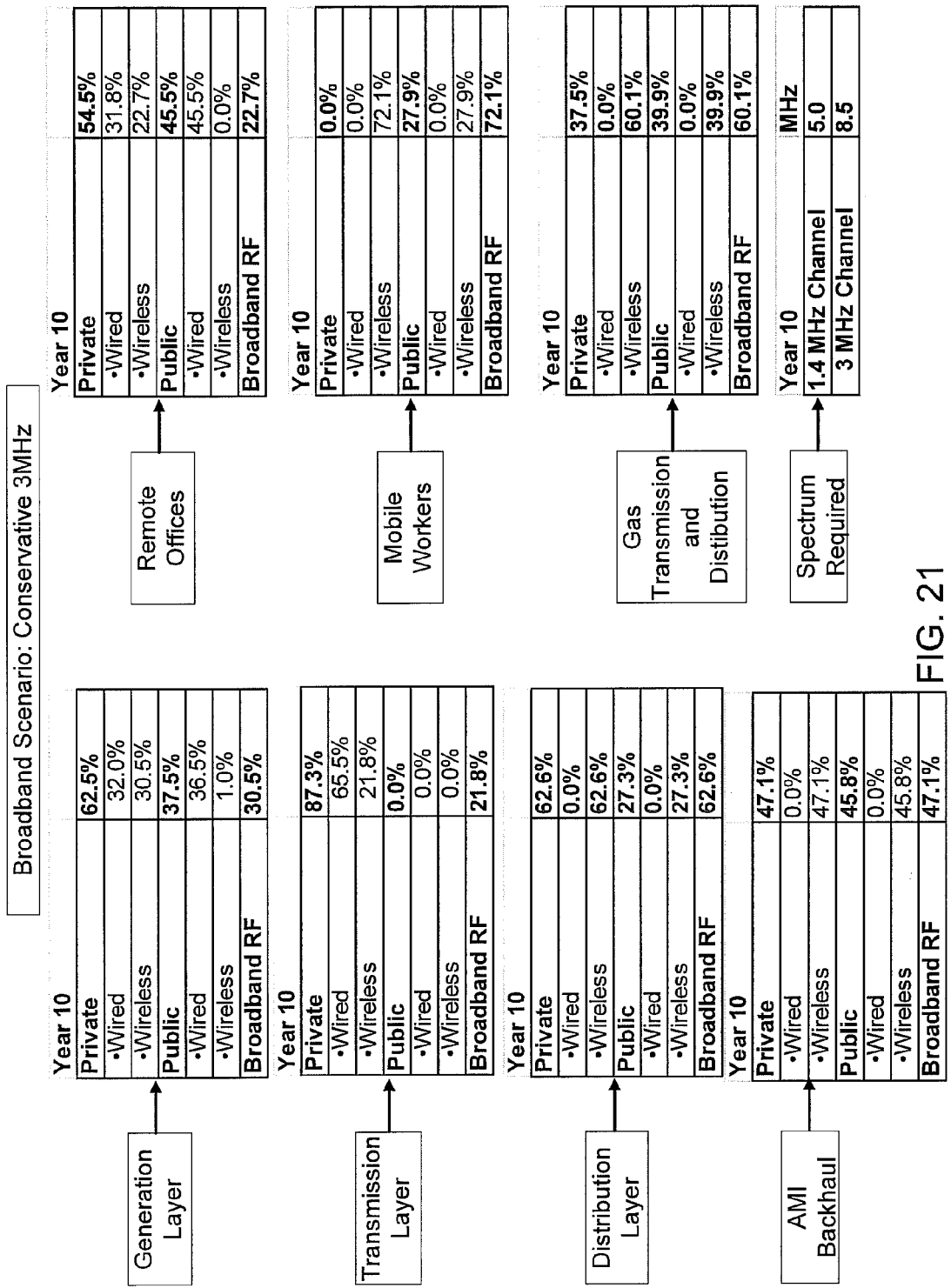

FIG. 21 shows a screenshot of an executive dashboard summary of the estimated network outputs generated by the simulation. The dashboard summary shows the percentage of public versus private communications network infrastructure required, wired versus wireless network infrastructure required, percentage of broadband wireless infrastructure required, and total bandwidth and traffic consumption (tonnage) over ten years. The network output is shown for different domains, such as a generation layer, transmission layer, distribution layer, etc.

Figure 22:
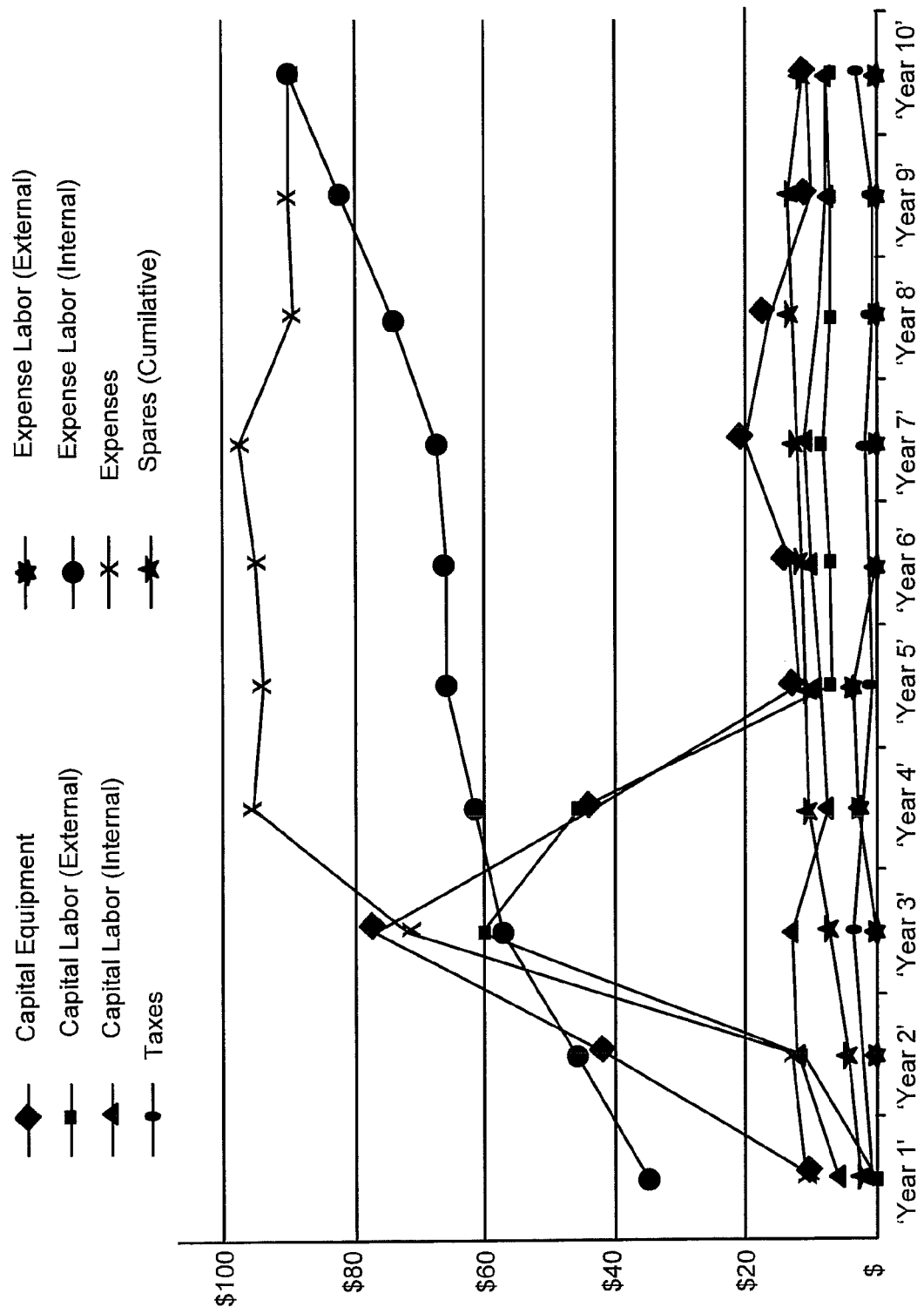

FIG. 22 shows a screenshot of an executive dashboard summary of the estimated cost outputs generated by the simulation. The summary of costs include costs over ten years to deploy, upgrade and maintain the smart grid communications network. Cost categories may include: CAPEX, OPEX, Labor, Headcount, Tax, Spares, Overhead, Expense, Capital, Equipment, etc. FIG. 22 is a graphical representation of some of the costs. A textual representation may also be provided, although not shown.

Figure 23:
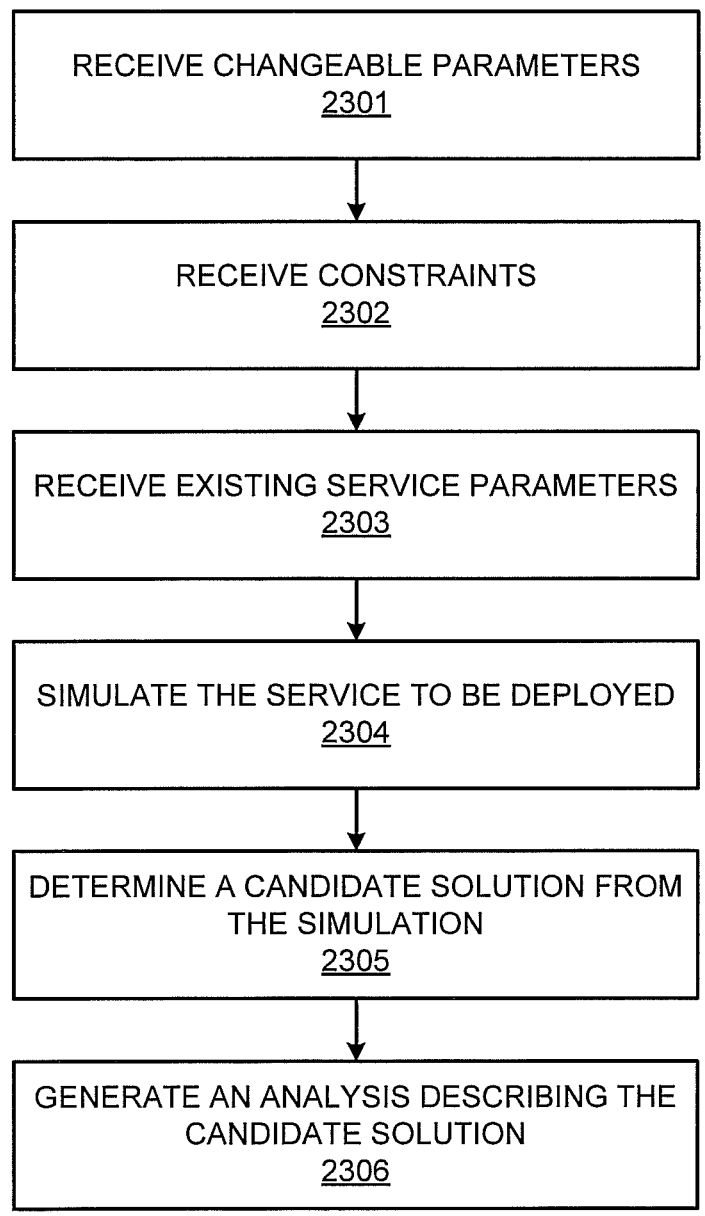
FIG. 23 illustrates a method 2300 for modeling and analyzing scenarios for a communications network service to be deployed; according to an embodiment.

FIG. 23 illustrates a method 2300 for modeling and analyzing scenarios for a communications network service to be deployed. The method 2300 is described with respect to one or more of FIGS. 1-4 by way of example. The method 2300 may be practiced in other systems. Also, the method 2300 may be used to model and analyze a smart grid communications network service, a 4G communications network service, or other types of communications network services.

At step 2301, changeable parameters are received. For example, the changeable parameters 102 shown in FIG. 1B may include business and technology changeable parameters. Business parameters are related to financial data for the service to be provided, such as costs, revenue, profit, budget, etc. Technology parameters relate to technology data for the service. Examples include coverage area, downlink bandwidth, QoS, etc. Other changeable parameters may include one or domains and utility sections for a smart grid service, package size, devices, and applications. The changeable parameters may be provided from a user via a user interface.

At step 2302, constraints are received. These may include parameters that must be met by the service to be deployed. For example, a certain level of QoS for a service may be required to provide the service, and a budget constraint identifies maximum expenditure.

At step 2303, existing service parameters are received. These parameters describe an existing service. For example, a service provider planning on deploying a 4G service or a smart grid service, may already provide 3G services or some portion of a smart grid service. Business and technology parameters describing the existing service are provided.

At step 2304, the service to be deployed is simulated using one or more of the changeable parameters, constraints, and existing service parameters. The system 100 is used to simulate the service. The simulation is performed using the models 110, which may include cost models, device models, network, IT systems and bandwidth models. For example, the models 110 store relationships between model parameters. The inputs, such as the changeable parameters, constraints, and existing service parameters, are determined. Values for a first set of model parameters dependent on these inputs are determined based on the stored relationships. Also, values for a second set of model parameters dependent on the first set of model parameters are determined based on stored relationship, and so on until values are determined for all or most of the model parameters.

For example, the relationship 341 shown in FIG. 3 represents that the number of cell sites may vary according to the bandwidth spectrum needed for the service. The number of cell sites is described as a dependent model parameter dependent on the corresponding spectrum model parameter. The relationship may indicate that if less spectrum is available, then more cell sites may be needed to account for demand. A bandwidth model stores an indicator that the spectrum model parameter is related to the number of cell sites model parameter in the network cost model. The bandwidth model may also store a relationship curve that is used to identify the estimated number of cell sites for a spectrum model parameter value. Thus, given a value for the spectrum model parameter, a value for the number of cell sites model parameter is determined from the curve. Then, the models may store a relationship between number of cell sites and capital costs, and a value for capital costs may be determined at least partially based on the number of cell sites. Curves may be based on historic values for existing services. The simulation engine 101 uses the curves to estimate the values for model parameters. These type of mappings for the relationships may be stored for sets of related values, and are used to make educated estimations for the candidate solution.

At step 2305, a candidate solution is determined from the simulation, and at step 2306 an analysis is generated describing the candidate solution. The candidate solution may include business and technology sub-solutions related to financial data and technology data describing the service to be deployed. The generated analysis may include reports describing the sub-solutions. FIG. 4 shows an example of a report. The reports include the values for the model parameters determined from the simulations. The reports may be used to compare different candidate solutions. For example, the method 2300 is repeated for different sets of changeable parameters. Each candidate solution is analyzed to determine which best satisfies business and technology objectives.

Figure 24:
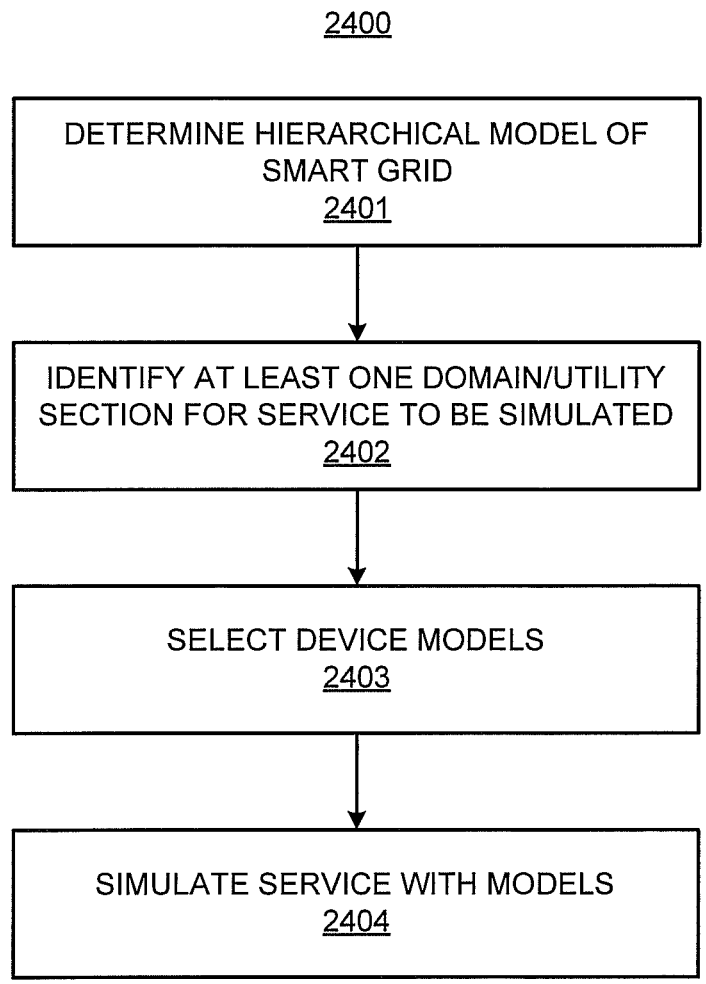
FIG. 24 illustrates a method 2400 for simulating the communications network service; according to an embodiment.

FIG. 24 illustrates a method 2400 for simulating the communications network service. The steps of the method 2400 may be performed for the step 2004 of the method 2000. The method 2400 is described with respect to a smart grid service by way of example. The method can apply to other types of communications network services. The method 2400 is described with respect to the simulation engine in FIG. 1B but may be practiced in other systems.

At step 2401, the simulation engine 101 determines a hierarchal model of a smart grid including domains and utility sections for the smart grid. The hierarchal model may be stored in data storage used by the simulation engine 101. The hierarchal model may include relationships between different domains and utility sections in the hierarchy. An example of the hierarchy is shown in FIG. 5.

At step 2402, the simulation engine 101 identifies, from the hierarchal model of the smart grid, at least one domain and at least one utility section for the smart grid communications network service to be simulated. For example, the smart grid service may be a grid operations application that requires communication through one or more of the domains 501-507 and the utility sections shown in FIG. 5. These domains and utility sections performing the communications are selected.

At step 2403, the simulation engine 101 selects device models from a plurality of device models based on the identified domains and utility sections. Examples of the device models are described above and shown in FIGS. 12-19. The device models may also be selected based on the changeable parameters that describe the criteria for the service. Device models for particular applications and package sizes that are specific to the service are selected.

At 2404, the simulation engine 101 simulates the smart grid communications network service using the traffic profiles from the selected device models. For example, the simulation determines estimations of bandwidth needed and costs for the service based on traffic profiles in the selected device models and cost models. Estimating the bandwidth may include determining a relationship between the identified at least one domain and another domain in the hierarchal model of the smart grid and determining the estimated bandwidth needed for the service based on the determined relationship. For example, the simulation engine 101 may include a bandwidth estimation tool that aggregates bandwidth for the applications and devices in a lower domain to determine the bandwidth needed in an upper domain to transmit the data for the devices and applications. An example is shown in FIG. 5 by the dashed lines in the distribution/feeder line utility section and the distributed generator utility section. The dashed line represent the aggregation from the lower device and LAN domains 502 and 503 to the backhaul domain 503. The aggregation is used to determine the bandwidth needed in the backhaul and WAN domains 504 and 505. The estimated bandwidth and costs are provided in a candidate solution.

The decision management system 100 performs technical steps in the process of simulating different network configurations via scenarios having different bandwidths. Moreover, bandwidth requirements and other requirements are determined based on a bandwidth model and other models. The model parameters are related to technical data which can be physically measured, i.e. the bandwidth of a data connection. The bandwidth model, for example, is a model including model parameters related to the bandwidth of a data connection. Furthermore, the bandwidth requirements for each scenario are determined based on the technical model parameters. Thus, the embodiments utilize technical features and do not simply achieve a result related to technical features.

The decision management system 100 is operable to simulate various configurations related to technical parameters prior to building out of a smart grid network. Moreover, due to the simulation, it is possible that extensive resource consumption through testing of real life communications network services may be avoided. Therefore, the user is relieved from the mental task of carrying out a number of operations individually. Furthermore, the user may use the optimal configuration provided by the decision management system 100 for a task the user has to perform, i.e. deployment of a communications network.

Further, the decision management system 100 provides an improved man-machine interaction, wherein a user is in a position to process data in a simple and more efficient manner. As an example, the simulation may allow that data may be processed and provided to the user in a faster manner, than with the efforts of a human alone. The simulation performs several simulations determining the impact of different configurations at the direction of a user wanting to determine an optimal configuration. These simulations are based on the relationships between parameters of the different models. The user may additionally run more simulations once the first simulations are complete. Also, simulation results may be presented in a manner such as shown in FIGS. 20-22 that allows a user to quickly and efficiently identify an optimal configuration.

FIG. 25 shows a computer system 2500 that may be used with the embodiments described herein. The computer system 2500 represents a generic platform that includes components that may be in a server or other computer system. The computer system 2500 may be used as a platform for the decision management system 100 and for executing one or more of the methods, functions, and steps described herein. These steps may be embodied as software stored on one or more non-transitory computer readable storage mediums.

The computer system 2500 includes a processor 2502 that may implement or execute software instructions performing some or all of the methods, functions and other steps described herein. Commands and data from the processor 2502 are communicated over a communication bus 2504. The computer system 2500 also includes a main memory 2506, such as a random access memory (RAM), where the software and data for processor 2502 may reside during runtime, and a secondary data storage 2508, which may be non-volatile and stores software and data. The memory and data storage are examples of computer readable storage mediums.

The computer system 2500 may include one or more I/O devices 2510, such as a keyboard, a mouse, a display, etc. The computer system 2500 may include a network interface 2512 for connecting to a network. It will be apparent to one of ordinary skill in the art that other known electronic components may be added or substituted in the computer system 2500.

The models 110 in the decision management system 100 of FIGS. 1A-B may be stored in a database provided in the secondary data storage 2508. The simulation engine 101 may be executed by the processor 2502 to generate the candidate solution 120. Also, a user interface for the system 100 may be generated by the processor 2502 and presented using the I/O device 2510. The user interface can output reports for the candidate solutions and receive user input, which may include parameters 102 and constraints 103.

One or more of the steps of the methods described herein and other steps described herein and one or more of the components of the systems described herein may be implemented as computer code stored on a computer readable storage medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable storage medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments.

What is claimed is:

1. A non-transitory computer readable storage medium including instructions executed by a computer system to perform simulating and analyzing of one or more scenarios for a smart grid communications network service to be deployed, the instructions comprising:

receiving business and technology changeable parameters for the smart grid communications network service to be deployed, wherein the business changeable parameters are financial data for the smart grid communications network service to be deployed;

determining a hierarchal model of a smart grid including
domains and utility sections for the smart grid in different levels of the hierarchal model;
identifying, from the hierarchal model of the smart grid, at least one domain and at least one utility section for the smart grid communications network service;
selecting device models from a plurality of device models based on the identified at least one domain and at least one utility section, wherein the selected device models represent different smart grid domain devices in the identified at least one domain and at least one utility section and include traffic profiles for the different smart grid domain devices and smart grid applications executed by the devices;
simulating the smart grid communications network service using the changeable parameters, the device models, and a cost model to determine at least one candidate solution for deploying the service, wherein the at least one candidate solution includes smart grid domain devices and a smart grid application for deploying the smart grid communications network service, estimated bandwidth needed for the smart grid communications network service and estimated monetary costs for the smart grid communications network service,
wherein the simulating includes determining a relationship between the identified at least one domain and another domain in the hierarchal model of the smart grid; and determining the estimated bandwidth needed for the smart grid communications network service based on the determined relationship; and
generating an analysis of the at least one candidate solution to evaluate an impact of the changeable parameters.

2. The non-transitory computer readable storage medium of claim 1, wherein the domains for the smart grid comprise at least some of utility sections, devices, local area network, backhaul, wide area network, head-end and operations.

3. The non-transitory computer readable storage medium of claim 1, wherein the utility sections for the smart grid comprise at least some of transmission substations, distribution substations, distribution lines, generators, customer, mobile information technology and data center.

4. The non-transitory computer readable storage medium of claim 1, wherein the at least one candidate solution includes a package size for devices for current and future deployment of the service, and the estimated bandwidth comprises raw bandwidth and protocol bandwidth for current and future deployment of the service, and for the estimated bandwidth needed for the service, an amount of the estimated bandwidth provided by a public network and an amount of the estimated provided by a private network.

5. The non-transitory computer readable storage medium of claim 1, wherein the cost model comprises a base case model and the simulating comprises determining the estimated costs based on the base case model, wherein the estimated costs comprise operational costs and capital expenditures for the smart grid communications network service.

6. The non-transitory computer readable storage medium of claim 1, wherein the cost model comprises a network cost model and the simulating comprises determining the estimated costs based on the network cost model, wherein the estimated costs comprise costs for the smart grid domain devices and the smart grid application.

7. The non-transitory computer readable storage medium of claim 1, wherein the cost model includes a dependent model parameter that is dependent on a corresponding dependent model parameter in the model.

8. The non-transitory computer readable storage medium of claim 7, wherein the dependent model parameter varies based on a predetermined relationship with its corresponding dependent model parameter.

9. The non-transitory computer readable storage medium of claim 8, wherein the method further comprises storing mappings that represent the predetermined relationships.

10. The non-transitory computer readable storage medium of claim 1, wherein the simulating comprises simulating the service to determine multiple candidate solutions; and
generating the analysis includes generating the analysis for each of the multiple candidate solutions to identify a candidate solution that satisfies a business objective and a technology objective.

11. The non-transitory computer readable storage medium of claim 1, wherein the analysis includes cost and revenue projections over a predetermined period of time for deploying the service and technology requirements for deploying the service over the predetermined period of time.

12. A decision management system comprising:
data storage storing device models describing traffic profiles for smart grid domain devices and smart grid applications and a cost model; and
a processor executing a simulation engine to simulate deploying of a smart grid communications network service using business and technology changeable parameters, the device models and the cost model to determine at least one candidate solution, wherein the business changeable parameters are financial data for the smart grid communications network service to be deployed, and
to simulate deploying of the smart grid communications network service, the simulation engine is to
determine a hierarchal model of a smart grid including domains and utility sections for the smart grid;
identify, from the hierarchal model of the smart grid, at least one domain and at least one utility section for the smart grid communications network service;
select the device models from a plurality of device models based on the identified at least one domain and at least one utility section; and
use the traffic profiles from the selected device models for the simulation,
wherein the simulation engine generates an analysis of the at least one candidate solution.

13. The decision management system of claim 12, wherein the at least one candidate solution includes estimations of business and technology parameters describing deployment of the service over a period of time into the future.

14. The decision management system of claim 12, further comprising:
a user interface receiving the business and technology changeable parameters from a user and outputting the analysis.

15. The decision management system of claim 12, wherein the simulation engine simulates the smart grid communications network service deployment by:
determining a relationship between the identified at least one domain and another domain in the hierarchal model of the smart grid; and
determining the estimated bandwidth needed for the smart grid communications network service based on the determined relationship.

16. A method for simulating and analyzing one or more scenarios for a smart grid communications network service to be deployed, the method comprising:

receiving business and technology changeable parameters for the smart grid communications network service to be deployed, wherein the business changeable parameters are financial data for the smart grid communications network service to be deployed;

determining a hierarchal model of a smart grid including domains and utility sections for the smart grid in different levels of the hierarchal model;

identifying, from the hierarchal model of the smart grid, at least one domain and at least one utility section for the smart grid communications network service;

selecting device models from a plurality of device models based on the identified at least one domain and at least one utility section, wherein the selected device models represent different smart grid domain devices in the identified at least one domain and at least one utility section and include traffic profiles for the different smart grid domain devices and smart grid applications executed by the devices;

simulating, by a processor, the smart grid communications network service using the changeable parameters, the device models, and a cost model to determine at least one candidate solution for deploying the service, wherein the at least one candidate solution includes smart grid domain devices and a smart grid application for deploying the smart grid communications network service, estimated bandwidth needed for the smart grid communications network service and estimated costs for the smart grid communications network service, wherein the simulating includes determining a relationship between the identified at least one domain and another domain in the hierarchal model of the smart grid; and determining the estimated bandwidth needed for the smart grid communications network service based on the determined relationship; and generating an analysis of the at least one candidate solution to evaluate an impact of the changeable parameters.

* * * * *